US012497789B2

(12) United States Patent
Chen et al.

(10) Patent No.: US 12,497,789 B2
(45) Date of Patent: Dec. 16, 2025

(54) INTERLOCKING WORK PLATFORM SYSTEM

(71) Applicant: Werner Co., Greenville, PA (US)

(72) Inventors: Fang Chen, Shanghai (CH); Liang He, Shanghai (CH); Ling Zhu, Shanghai (CH)

(73) Assignee: Werner Co., Itasca, IL (US)

( * ) Notice: Subject to any disclaimer, the term of this patent is extended or adjusted under 35 U.S.C. 154(b) by 881 days.

(21) Appl. No.: 17/681,076

(22) Filed: Feb. 25, 2022

(65) Prior Publication Data

US 2022/0282501 A1 Sep. 8, 2022

Related U.S. Application Data

(60) Provisional application No. 63/155,722, filed on Mar. 2, 2021.

(51) Int. Cl.

| | |
|---|---|
| ***E04G 1/30*** | (2006.01) |
| ***E06C 1/39*** | (2006.01) |
| ***E06C 1/393*** | (2006.01) |

(52) U.S. Cl.

CPC ................ *E04G 1/30* (2013.01); *E06C 1/393* (2013.01); *E04G 2001/305* (2013.01)

(58) Field of Classification Search

CPC .... E04G 1/15; E04G 1/30; E04G 1/34; E04G 2001/157; E04G 2001/302; E04G 2001/305; E04G 5/00; E04G 5/02; E04G 7/02; E06C 1/39; E06C 1/393; E06C 7/16

See application file for complete search history.

(56) References Cited

U.S. PATENT DOCUMENTS 1,359,297 A 11/1920 Voss
1,359,452 A 11/1920 Walker
1,377,095 A 5/1921 Rupp
2,186,484 A 1/1940 Gunther
2,446,005 A * 7/1948 Hartmann ................ E04G 1/34 248/245
2,546,387 A 3/1951 Coffing (Continued)

FOREIGN PATENT DOCUMENTS

CA 3150583 A1 * 9/2022 ............... E04G 7/02
CN 105201192 12/2015

(Continued)

OTHER PUBLICATIONS

Extended European Search Report issued in App. No. EP24156673.6, dated Apr. 22, 2024, 6 pages.

(Continued)

*Primary Examiner* — Ryan D Kwiecinski

(74) *Attorney, Agent, or Firm* — Fitch, Even, Tabin & Flannery LLP

(57) ABSTRACT

A work platform system having a first work platform. The first work platform having a first hook assembly and a first latch assembly. The system having a second work platform. The second work platform having a second hook assembly and a second latch assembly. The first work platform locked to the second work platform through the first hook assembly engaging with the second latch assembly and the first hook assembly in the use position. A method for using a work platform system. A method for producing a work platform.

20 Claims, 16 Drawing Sheets

(56) References Cited

U.S. PATENT DOCUMENTS 2,729,516 A * 1/1956 Colvin .................... E04G 1/34 182/155
3,128,842 A 4/1964 Satrum
3,692,143 A 9/1972 Kummerlin
3,730,465 A 5/1973 Gonzalez
4,519,476 A * 5/1985 Alimbau Marques .... E06C 1/56 182/35
5,067,589 A 11/1991 Bartnicki
5,358,069 A * 10/1994 Krause .................... E06C 1/39 182/27
5,676,062 A * 10/1997 Lloyd ................ A61G 13/105 108/132
5,678,653 A * 10/1997 Clinch .................... E04G 5/00 182/119
5,746,288 A * 5/1998 O'Neal .................... E04G 1/34 182/222
5,857,229 A * 1/1999 Magnani, Jr. ........ A47D 13/063 5/98.1
8,042,653 B2 * 10/2011 Grebinoski .............. E04G 1/30 182/223
8,186,480 B1 * 5/2012 Yoakum, Jr. ............. E04G 1/34 182/123
D776,826 S * 1/2017 Foley ...................... E04G 1/34 D25/66
9,752,334 B2 * 9/2017 Foley ...................... E04G 1/34
9,986,831 B2 6/2018 Smith
10,012,000 B2 * 7/2018 Yoo ......................... E04G 5/16
10,035,255 B2 * 7/2018 Cindric ................... B25H 1/10
10,145,128 B2 * 12/2018 Woodward ............... E04G 1/34
10,435,894 B2 * 10/2019 Woodward ............... E04G 1/34
10,612,304 B2 * 4/2020 Fischer .................... E04G 1/30
10,738,487 B2 * 8/2020 Woodward ............... E04G 1/30
D895,844 S * 9/2020 Woodward ................... D25/66
D895,845 S * 9/2020 Woodward ................... D25/66
10,801,219 B2 * 10/2020 Parker ...................... E04G 1/30
10,815,680 B2 * 10/2020 Woodward ............... E04G 1/30
10,858,848 B2 * 12/2020 Woodward ............... E04G 1/30
11,414,878 B2 * 8/2022 Xie .......................... E04G 1/30
11,686,429 B2 * 6/2023 Choi ...................... F16M 11/38 248/166
D1,047,872 S * 10/2024 Li .............................. D25/66
12,320,133 B2 6/2025 Melton
2002/0096397 A1 * 7/2002 Wyse ....................... E04G 1/28 182/118
2002/0189902 A1 12/2002 Nelson
2004/0238278 A1 * 12/2004 Gibson .................. E06C 1/393 182/129
2004/0238280 A1 * 12/2004 Gibson .................. E06C 1/393 182/153
2006/0130715 A1 * 6/2006 Yoo ......................... E04G 1/34 108/54.1
2006/0169539 A1 * 8/2006 Grebinoski .............. E04G 1/15 182/223
2007/0074932 A1 4/2007 Mutscheller
2009/0133959 A1 * 5/2009 Eriksson .................. E04G 1/34 182/118
2010/0071996 A1 * 3/2010 Huang ..................... E04G 1/34 182/118
2010/0282540 A1 * 11/2010 Moss ....................... E06C 7/16 220/570
2011/0056764 A1 * 3/2011 Cross ....................... E06C 1/32 182/27
2016/0138338 A1 * 5/2016 Olson .................... E06C 1/397 182/124
2017/0044780 A1 * 2/2017 Foley ....................... E04G 1/34
2017/0275897 A1 * 9/2017 Weadward ............... E04G 1/34
2017/0275898 A1 * 9/2017 Woodward ............... E04G 1/28
2017/0275899 A1 * 9/2017 Woodward ............... E04G 1/34
2017/0275900 A1 * 9/2017 Woodward ............... E06C 1/39
2017/0334059 A1 * 11/2017 Moffat .................. A47C 16/04
2018/0171648 A1 * 6/2018 Woodward ............... E04G 1/15
2018/0202177 A1 * 7/2018 Woodward ............... E04G 1/30
2018/0363307 A1 * 12/2018 Parker ...................... E04G 1/28
2019/0119932 A1 * 4/2019 Woodward ............... E04G 1/32
2019/0226217 A1 * 7/2019 Foley ....................... E04G 1/34
2019/0387887 A1 * 12/2019 Yan .......................... E04G 1/34
2020/0063493 A1 * 2/2020 Yoo ........................ E06C 7/182
2020/0102760 A1 * 4/2020 Woodward ............... E04G 1/34
2021/0025180 A1 1/2021 Parker
2021/0087882 A1 3/2021 Waddell
2021/0164243 A1 * 6/2021 Foley ....................... E04G 1/32
2022/0003008 A1 * 1/2022 Melton .................. E06C 1/393
2022/0053939 A1 * 2/2022 Leng ........................ E04G 1/32
2022/0178153 A1 * 6/2022 Woodward ............... E06C 7/00
2022/0282501 A1 * 9/2022 Chen ...................... E06C 1/393
2023/0014482 A1 * 1/2023 Ramalho .................. E04G 1/30
2023/0139449 A1 * 5/2023 Pozgay .................... E06C 1/39 182/20
2025/0084699 A1 3/2025 Chen
2025/0154779 A1 5/2025 Chen

FOREIGN PATENT DOCUMENTS

CN 106184139 A * 12/2016 .............. B25H 1/02
CN 106193564 A * 12/2016 .............. E04G 1/34
CN 107214677 9/2017
CN 108086665 A * 5/2018 .............. E04G 5/16
CN 208534971 U * 2/2019 .............. E04G 1/34
CN 111608375 A * 9/2020 .............. E04G 5/00
CN 111734101 A * 10/2020 .............. E04G 1/15
CN 112145065 A * 12/2020 .............. E06C 7/50
CN 112282332 A * 1/2021 .............. E06C 1/18
CN 112299241 A * 2/2021 .............. B66D 1/14
CN 214382300 U * 10/2021 ............ A47C 12/00
DE 4405289 C1 * 7/1995 .............. E04G 5/06
DE 4447467 A1 * 8/1995 ............ E04G 5/061
DE 202017100661 U1 * 4/2018 ............ E04G 1/365
EP 0017957 A1 * 10/1980 ............ E04G 1/154
EP 1574636 9/2005
EP 1788167 A1 * 5/2007 .............. E04G 1/34
EP 2287106 A2 2/2011
EP 3372751 9/2018
EP 3372751 A1 * 9/2018 .............. E06C 1/39
EP 3741927 A1 * 11/2020 .............. E04G 1/32
EP 3933164 A1 * 1/2022 ............ E06C 1/393
FR 2890677 3/2007
FR 2914338 10/2008
FR 2975116 11/2012
GB 2204906 A * 11/1988 .............. E06C 1/39
JP H11241501 A * 9/1999
JP 2004068436 A 3/2004
JP 2018178390 A 11/2018
JP 2020002651 1/2020
KR 20060071682 A 6/2006
KR 100855365 B1 * 9/2008 .............. E04G 1/34
KR 20090000735 U * 1/2009 .............. E04G 1/34
KR 20090007010 U * 7/2009 .............. E04G 1/34
KR 20090007282 U * 7/2009 .............. E04G 1/34
KR 20090088155 A * 8/2009 .............. B25H 1/06
KR 20090088156 A * 8/2009 .............. E04G 1/32
KR 200448932 Y1 * 6/2010
KR 100977715 B1 * 8/2010
KR 20100010258 U * 10/2010 .............. E04G 5/08
KR 20180112396 A * 10/2018 .............. E06C 7/50
KR 200493337 Y1 * 3/2021 ............ E06C 7/188
KR 20210000960 U * 5/2021 .............. E06C 1/39
KR 20220043608 A * 4/2022 ............ B63B 73/60
WO 2007132148 11/2007
WO WO-2023084078 A1 * 5/2023 ............ E04G 7/304
WO 2023147182 8/2023

OTHER PUBLICATIONS

Extended European Search Report issued in App. No. EP24204664.7, dated Jan. 20, 2025, 9 pages.
Chen, Fang et al.; Multi-Position Ladder, and Methods; U.S. Appl. No. 63/305,210, filed Jan. 31, 2022; 44 pages.

* cited by examiner 36,48
92
94
51
98
102
100

53
54

96
52

136, 148
92
72
74
94
96
98
51
52
53
54
100
120
122

INTERLOCKING WORK PLATFORM SYSTEM

CROSS-REFERENCE TO RELATED APPLICATIONS

This is a nonprovisional of U.S. provisional patent application Ser. No. 63/155,722 filed Mar. 2, 2021, incorporated by reference herein.

FIELD

The present invention pertains to a work platform and work platform system formed by connecting two work platforms together. This permits a user to move from one platform to the other without getting off either platform to do so. (As used herein, references to the "present invention" or "invention" relate to exemplary embodiments and not necessarily to every embodiment encompassed by the appended claims.) More specifically, the present invention pertains to a work platform system formed by connecting two work platforms together, thereby permitting a user to move from one platform to the other without getting off either platform. The work platforms are locked together with a sliding hook assembly.

BACKGROUND

Scaffolds are commonly used to provide artisans with the ability to work across longer elevated spaces than they otherwise could on a ladder. In many instances, the longer the elevated work spaces the better for the artisans because they then do not have to climb down off the work platform to move the work platform to a new location to access a new elevated workspace in which they need to work. One way to provide a longer elevated workspace is to provide for individual longer work platforms. However, the larger the work platform becomes, the heavier it becomes and the more effort is needed to move the work platform when needed.

Another way to accomplish a longer elevated space is to connect two or more individual work platforms together to effectively double the elevated workspace that would otherwise be available for only one workspace. However, when combining two individual work platforms together, care must be taken so they are securely and safely connected. The work platforms also should be quickly and easily connectable.

BRIEF SUMMARY

The present invention pertains to a work platform and work platform system. The system comprises a first work platform. The first work platform comprises a first plank or scaffold having a first end and a second end and a plane upon which a user can stand. The first work platform comprises a first leg assembly rotatably attached with bolts to the first end of the first scaffold having a first rail and a second rail and a rung attached to the first rail and the second rail. The first leg assembly, when in a folded position relative to the first scaffold, is essentially parallel to the plane of the first scaffold. The first work platform comprises a second leg assembly rotatably attached with bolts to the second end of the first scaffold. The second leg assembly, when in an open position relative to the first scaffold, may be essentially perpendicular to the plane of the first scaffold. The first work platform comprises a first hook assembly slidingly attached to the first scaffold adjacent the first end which slides between a use position where the first hook assembly extends below and outward beyond the first scaffold between the first rail and the second rail of the first leg assembly and a stowed position where the first hook assembly is retracted below the first scaffold. The first work platform comprises a first latch assembly attached to the first scaffold adjacent the second end.

The work platform system comprises a second work platform. The second work platform comprises a second scaffold having a first end and a second end and a plane upon which the user can stand which is flat. The second work platform comprises a third leg assembly rotatably attached with bolts to the first end of the second scaffold. The third leg assembly having a first rail and a second rail and a rung attached to the first rail and the second rail of the third leg assembly. When the third leg assembly is in a closed position relative to the second scaffold, the third leg is essentially parallel to the plane of the second scaffold when the second scaffold is attached to the first scaffold. The second work platform comprises a fourth leg assembly rotatably attached with bolts to the second end of the second scaffold. When the second leg assembly of the second scaffold is in an open position relative to the second scaffold, it is essentially perpendicular to the plane of the second scaffold. The second work platform comprises a second hook assembly slidingly attached to the second scaffold adjacent the second end of the second scaffold which slides between a use position where the second hook assembly extends below and outward beyond the second scaffold between the first rail and the second rail of the fourth leg assembly and a stowed position where the first hook assembly is retracted below the first scaffold. The second work platform comprises a second latch assembly attached to the second scaffold adjacent the first end of the second scaffold. The first work platform is locked to the second work platform through the first hook assembly engaging with the second latch assembly when the first hook assembly is in the use position.

The present invention pertains to a work platform. The work platform comprises a first plank or scaffold having a first end and a second end and a plane upon which a user can stand. The work platform comprises a first leg assembly rotatably attached with bolts to the first end of the first scaffold. The first leg assembly having a first rail and a second rail and a rung attached to the first rail and the second rail. When the first leg assembly is in a folded position relative to the first scaffold, it is essentially parallel to the plane of the first scaffold. The work platform comprises a second leg assembly rotatably attached with bolts to the second end of the first scaffold. When the second leg assembly is in an open position relative to the first scaffold, it may be essentially perpendicular to the plane of the first scaffold. The work platform comprises a first hook assembly slidingly attached to the first scaffold adjacent the first end which slides between a use position where the first hook assembly extends below and outward beyond the first scaffold between the first rail and the second rail of the first leg assembly and a stowed position where the first hook assembly is retracted below the first scaffold, the first hook assembly having a hook crossbar. The work platform comprises a first latch assembly having latch assembly recesses and hooks positioned about the recesses. The first latch assembly attached to the first scaffold adjacent the second end.

The present invention pertains to a method for using a work platform system. The method comprises the steps of sliding a first hook assembly, attached adjacent to a first end of a first scaffold, into a use position where the first hook assembly extends below and outward beyond the first scaffold between a first rail and a second rail of a first leg assembly rotatably attached adjacent to the first end of the first scaffold from a stowed position where the first hook assembly is retracted below the first scaffold. There is the step of placing a second latch assembly, attached to a second scaffold adjacent a first end of the second scaffold, on the first hook assembly in the use position. There is the step of pushing down on the second scaffold so the second latch assembly engages with the first hook assembly and locks the first work platform to the second work platform with the first scaffold coplanar with the second scaffold and forming a surface.

The present invention pertains to a method for producing a work platform. The method comprises the steps of attaching a track to an underside of a scaffold. The method also includes the step of fitting a hook assembly to the track so the hook assembly slides along the track from a stowed position into a deployed position, where the hook assembly extends below and outward beyond the scaffold between a first rail and a second rail of a first leg assembly rotatably attached adjacent to the first end of the scaffold, and when the hook assembly is in a stowed position, the hook assembly is retracted below the scaffold. The method also includes the step of attaching a latch assembly to the bottom of the scaffold.

DETAILED DESCRIPTION

Figure 1C:
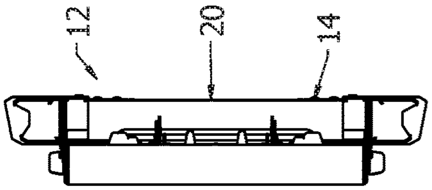
FIG. 1C is a front view of the work platform.
Figure 1D:
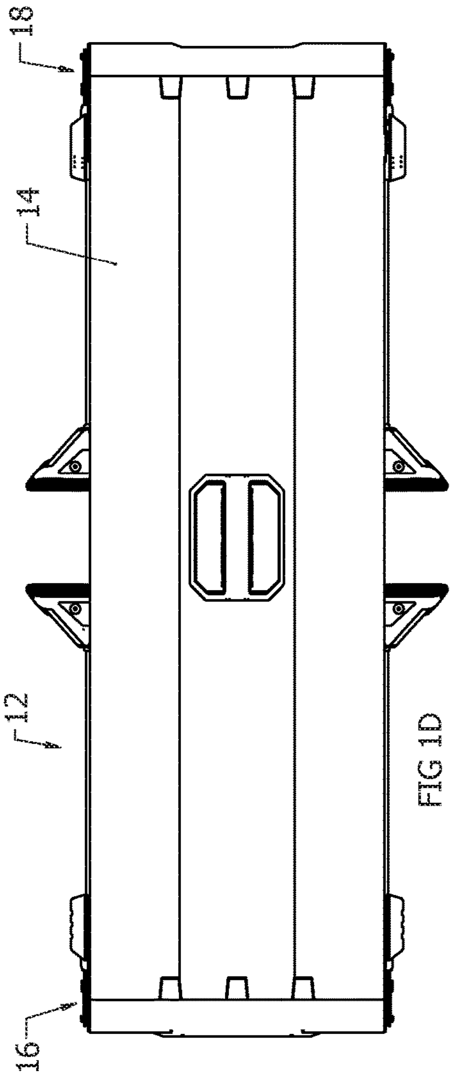
FIG. 1D is a top view of the work platform.
Figure 1B:
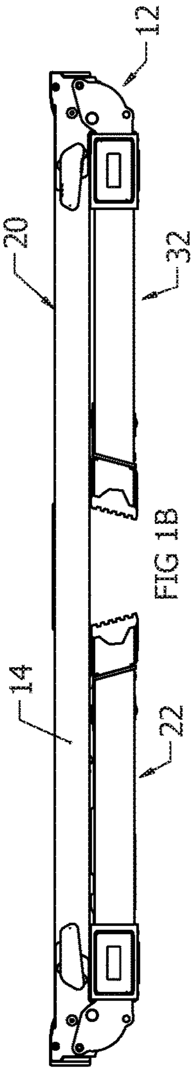
FIG. 1B is a side view of the work platform.
Figure 1A:
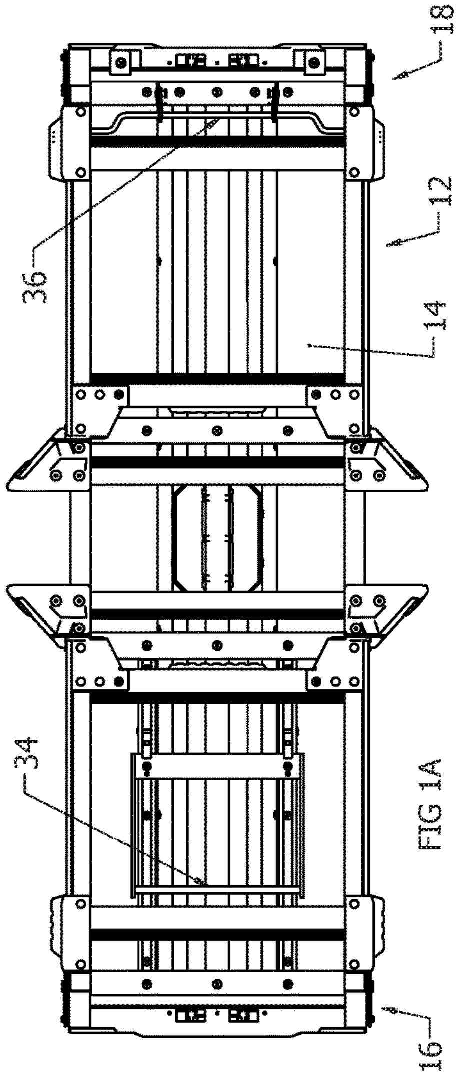
FIG. 1A is an underside view of a work platform.
Figure 1E:
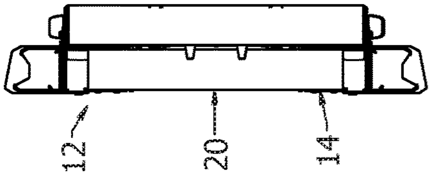
FIG. 1E is a rear view of the work platform.

Referring now to the drawings where like reference numerals refer to similar or identical parts throughout the several views, and more specifically to FIGS. 1A-11, there is shown a work platform system 10. The system 10 comprises a first work platform 12. The first work platform 12 comprises a first plank or scaffold 14 having a first end 16 and a second end 18 and a plane 20 upon which a user can stand. The first work platform 12 comprises a first leg assembly 22 rotatably attached with bolts 24 to the first end 16 of the first scaffold 14. The first leg assembly 22 having a first rail 26 and a second rail 28 and a rung 30 attached to the first rail 26 and the second rail 28. In FIG. 1B, the first leg assembly 22 is in a folded position relative to the first scaffold 14 and essentially parallel with the plane 20 of the first scaffold 14. The first work platform 12 comprises a second leg assembly 32 rotatably attached with bolts 24 to the second end 18 of the first scaffold 14. When the second leg assembly 32 is in an open position relative to the first scaffold 14, it may be essentially perpendicular to the plane 20 of the first scaffold 14. The first work platform 12 comprises a first hook assembly 34 slidingly attached to the first scaffold 14 adjacent the first end 16. The first hook assembly 34 being slidable between a use position where the first hook assembly 34 extends below and outward beyond the first scaffold 14 between the first rail 26 and the second rail 28 of the first leg assembly 22 and a stowed position where the first hook assembly 34 is retracted below the first scaffold 14. The first work platform 12 comprises a first latch assembly 36 attached to the first scaffold 14 adjacent the second end 18.

The work platform system 10 comprises a second work platform 38. The second work platform 38 comprises a second scaffold 40 having a first end 16 and a second end 18 and a plane 20 upon which the user can stand which is flat. The second work platform 38 comprises a third leg assembly 42 rotatably attached with bolts 24 to the first end 16 of the second scaffold 40 having a first rail 26 and a second rail 28 and a rung 30 attached to the first rail 26 and the second rail 28 of the third leg assembly 42. When the third leg assembly 42 is in a closed position relative to the second scaffold 40, it may be essentially parallel to the plane 20 of the second scaffold 40 when the second scaffold 40 is attached to the first scaffold 14. The second work platform 38 comprises a fourth leg assembly 44 rotatably attached with bolts 24 to the second end 18 of the second scaffold 40. When the second leg assembly 32 of the second scaffold 40 is in an open position relative to the second scaffold 40, it may be essentially perpendicular to the plane 20 of the second scaffold 40. The second work platform 38 comprises a second hook assembly 46 slidingly attached to the second scaffold 40 adjacent the second end 18 of the second scaffold 40. The second hook assembly being slidable between a use position where the second hook assembly 46 extends below and outward beyond the second scaffold 40 between the first rail 26 and the second rail 28 of the fourth leg assembly 44 and a stowed position where the first hook assembly 34 is retracted below the first scaffold 14. The second work platform 38 comprises a second latch assembly 48 attached to the second scaffold 40 adjacent the first end 16 of the second scaffold 40. Where the first work platform 12 is locked to the second work platform 38 through the first hook assembly 34 engaging with the second latch assembly 48 and the first hook assembly 34 in the use position.

The second latch assembly 48 may have latch assembly hooks 98 and 100, as shown in FIGS. 19-40. The first hook assembly 34 may have a hook crossbar 50 which is locked to the second latch assembly 48 by the latch assembly hooks 98 and 100 in the use position. The second latch assembly 48 may have recesses in which the hook crossbar 50 is locked into place by the latch assembly hooks 98 and 100 in the use position. The second latch assembly 48 may have springs engaged with the latch assembly hooks 98 and 100 which bias the latch assembly hooks 98 and 100 into a closed position to lock the hook crossbar 50 into place in the recesses in the use position.

The first hook assembly 34 may have a first hook 56 and a second hook 58 in parallel and spaced relation with the first hook 56, as shown in FIGS. 11-18. The hook crossbar 50 is attached to and extending between the first hook 56 and the second hook 58. The hook crossbar 50 may be attached adjacent a front end 60 of the first and second hooks 56, 58. The first hook 56 may have a top surface 62 and a first notch 64 disposed in the top surface 62 of the first hook 56, and the second hook 58 has a top surface 62 and a second notch 66 disposed in the top surface 62 of the second hook 58.

Figure 10:
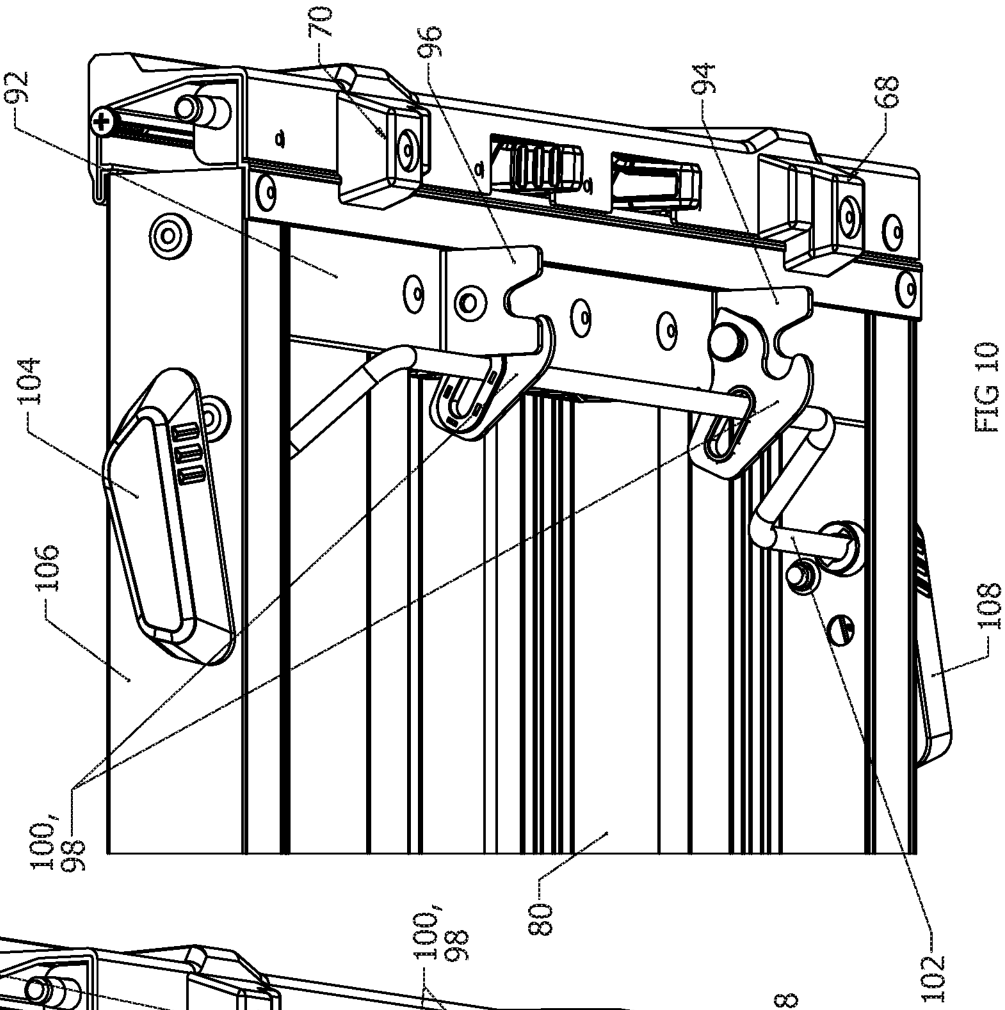
FIG. 10 is a bottom perspective view of a latch assembly in an open position.
Figure 9:
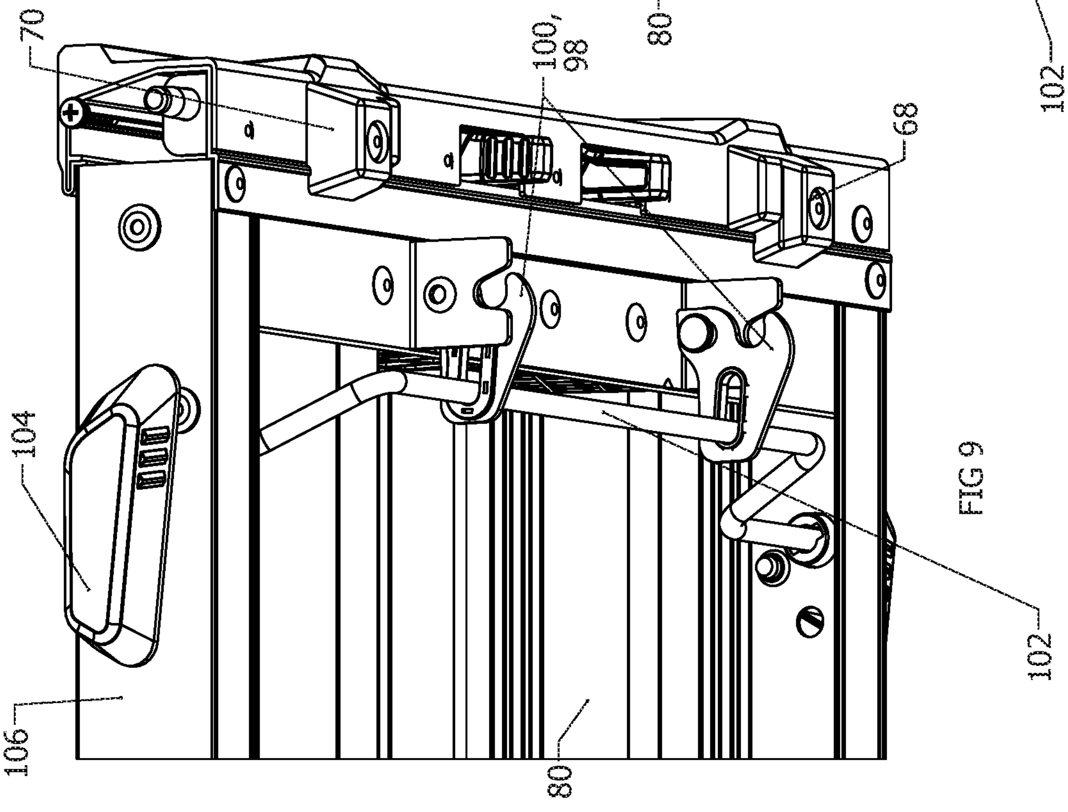
FIG. 9 is a bottom perspective view of a latch assembly in a closed position.

The system 10 may include a first projection 68 and a second projection 70 disposed adjacent the first end 16 of the second scaffold 40 and extending downward from the second scaffold 40, as shown in FIGS. 9-10. The first projection 68 engaged with the first notch 64 and the second projection 70 engaged with the second notch 66 in the use position. The second latch assembly 48 may automatically engage the hook crossbar 50 when the first and second projections 68, 70 are positioned in the first and second notches 64, 66, respectively. The second latch assembly 48 may include a first spring 53 in contact with a first latch assembly hook 98, and a second spring 54 in contact with a second latch assembly hook 100. The first spring 53 may be positioned about a first rivet 72 which rotationally attaches the first hook 56 to the first bracket 94 and the second spring 54 may be positioned about a second rivet 74 which rotationally attaches the second hook 58 to the second bracket 96.

Figure 16:
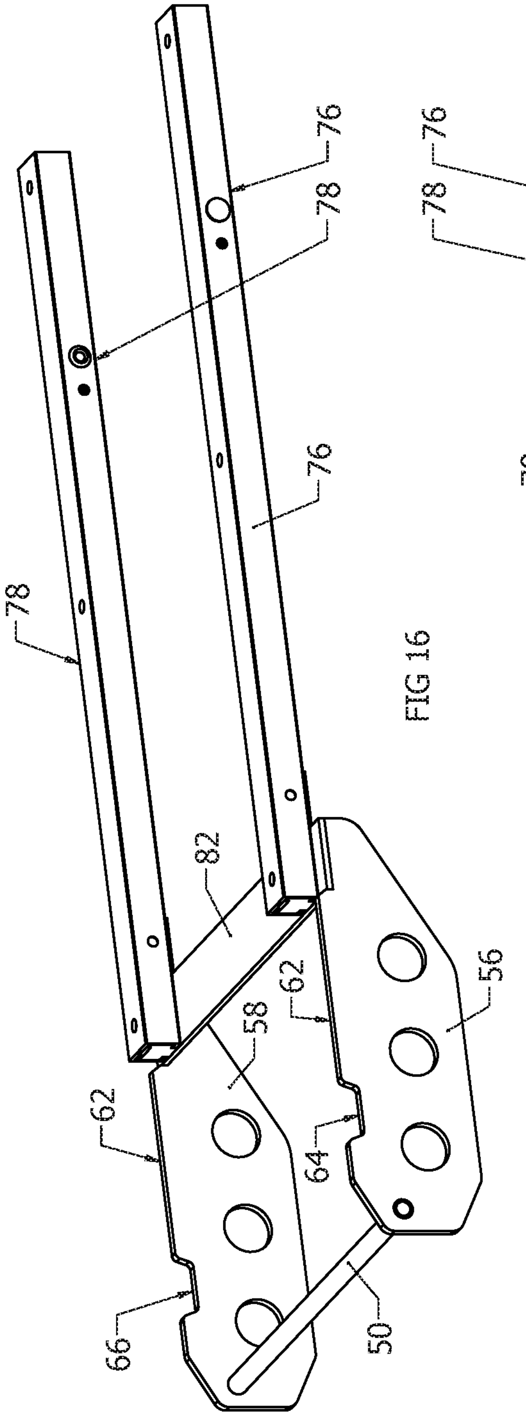
FIG. 16 is a perspective view of a hook assembly in a deployed state.
Figure 17:
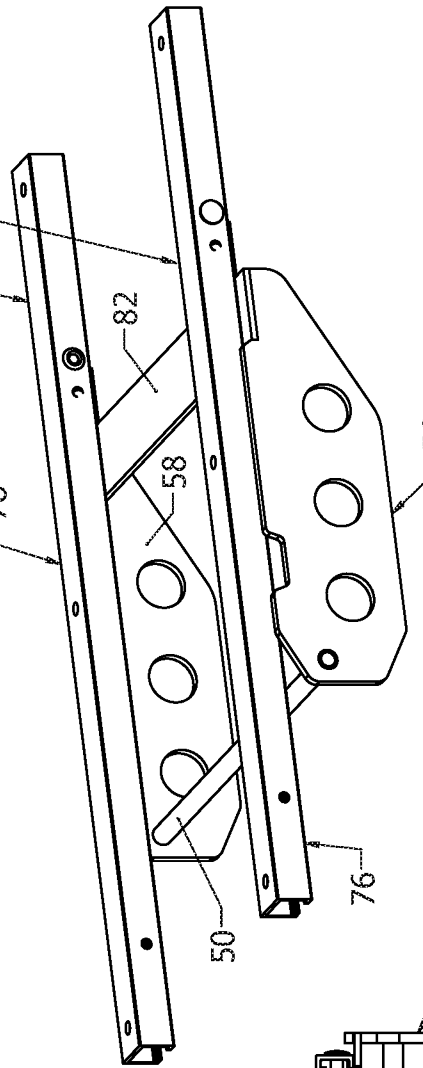
FIG. 17 is a perspective view of a hook assembly in an undeployed state.
Figure 18:
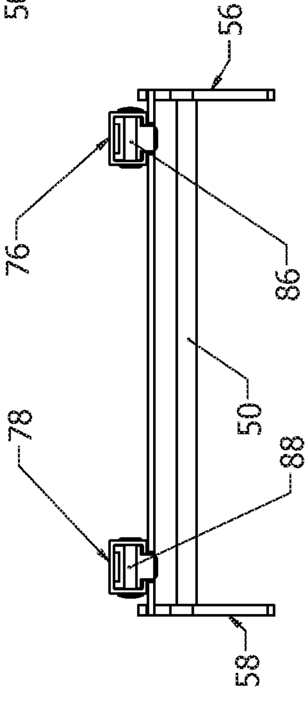
FIG. 18 is a front view of a hook assembly.
Figures 19, 20, 21, 22, 23, 24:
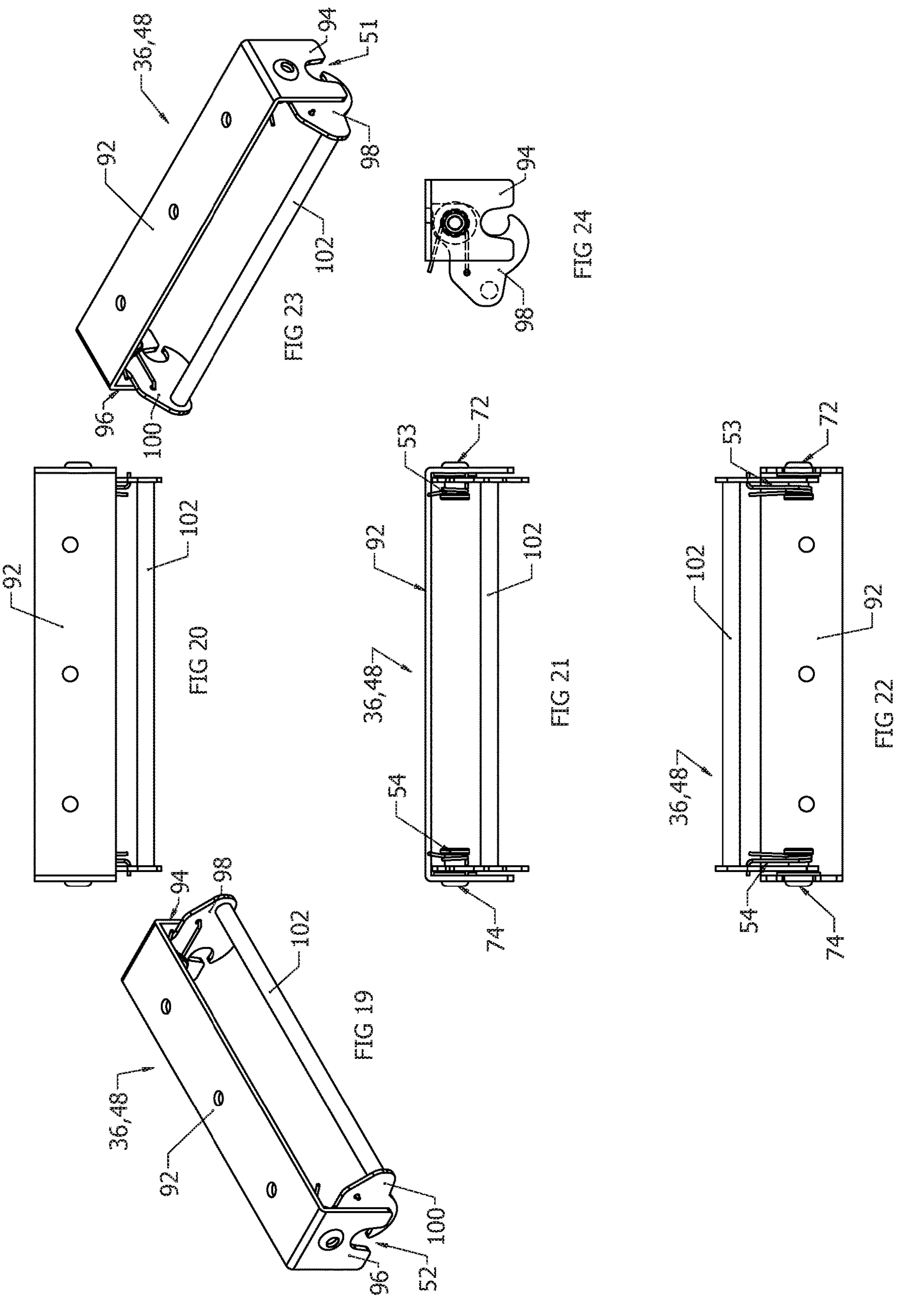
FIG. 19 is a first perspective view of a latch assembly.
FIG. 20 is a top view of a latch assembly.
FIG. 21 is a front view of a latch assembly.
FIG. 22 is a bottom view of a latch assembly.
FIG. 23 is a second perspective view of a latch assembly.
FIG. 24 is a side view of a latch assembly.
Figures 25, 26, 27, 28, 29, 30:
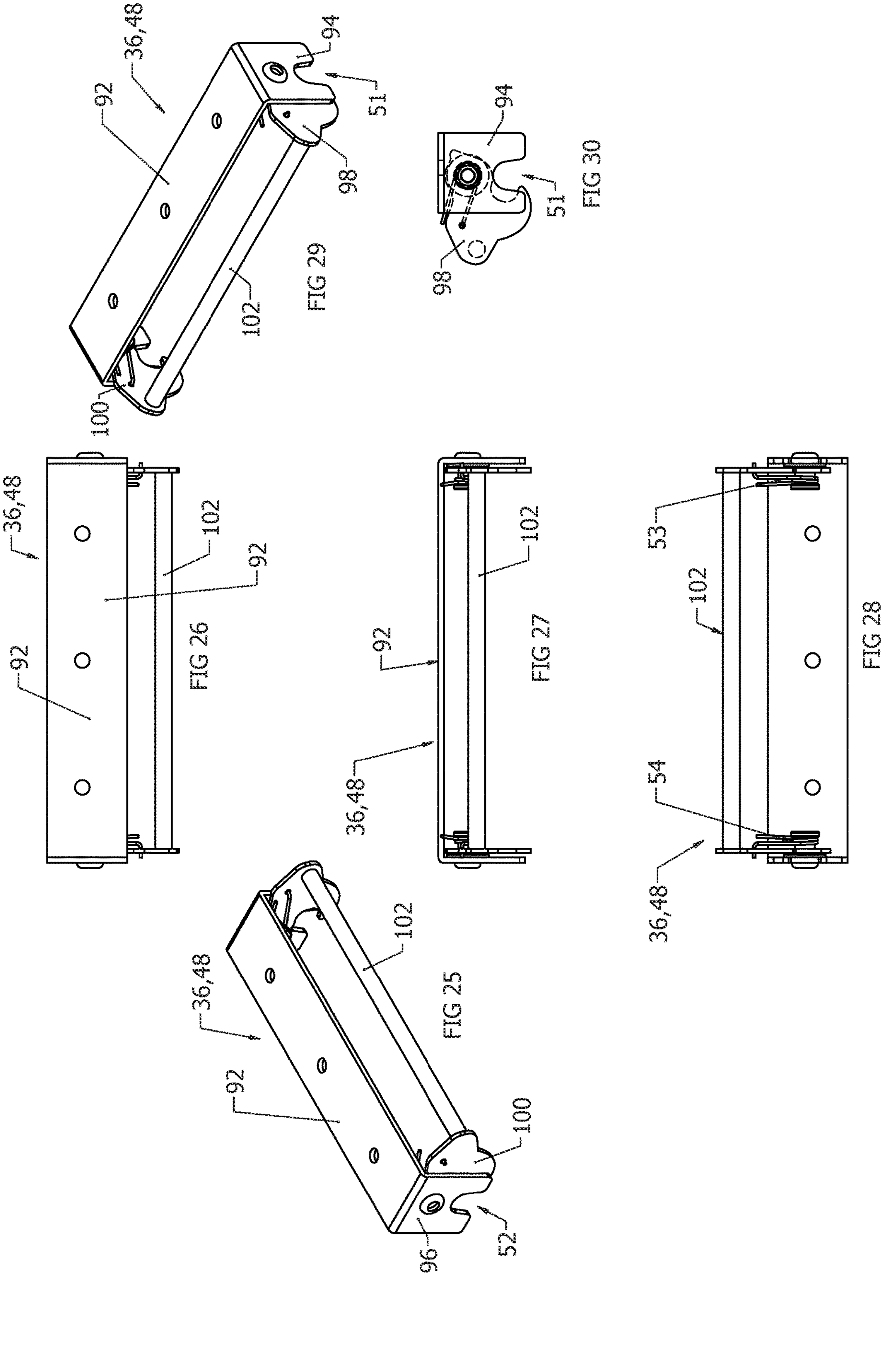
FIG. 25 is a first perspective view of a latch assembly.
FIG. 26 is a top view of a latch assembly.
FIG. 27 is a front view of a latch assembly.
FIG. 28 is a bottom view of a latch assembly.
FIG. 29 is a second perspective view of a latch assembly.
FIG. 30 is a side view of a latch assembly.
Figures 31, 32, 33, 34, 35:
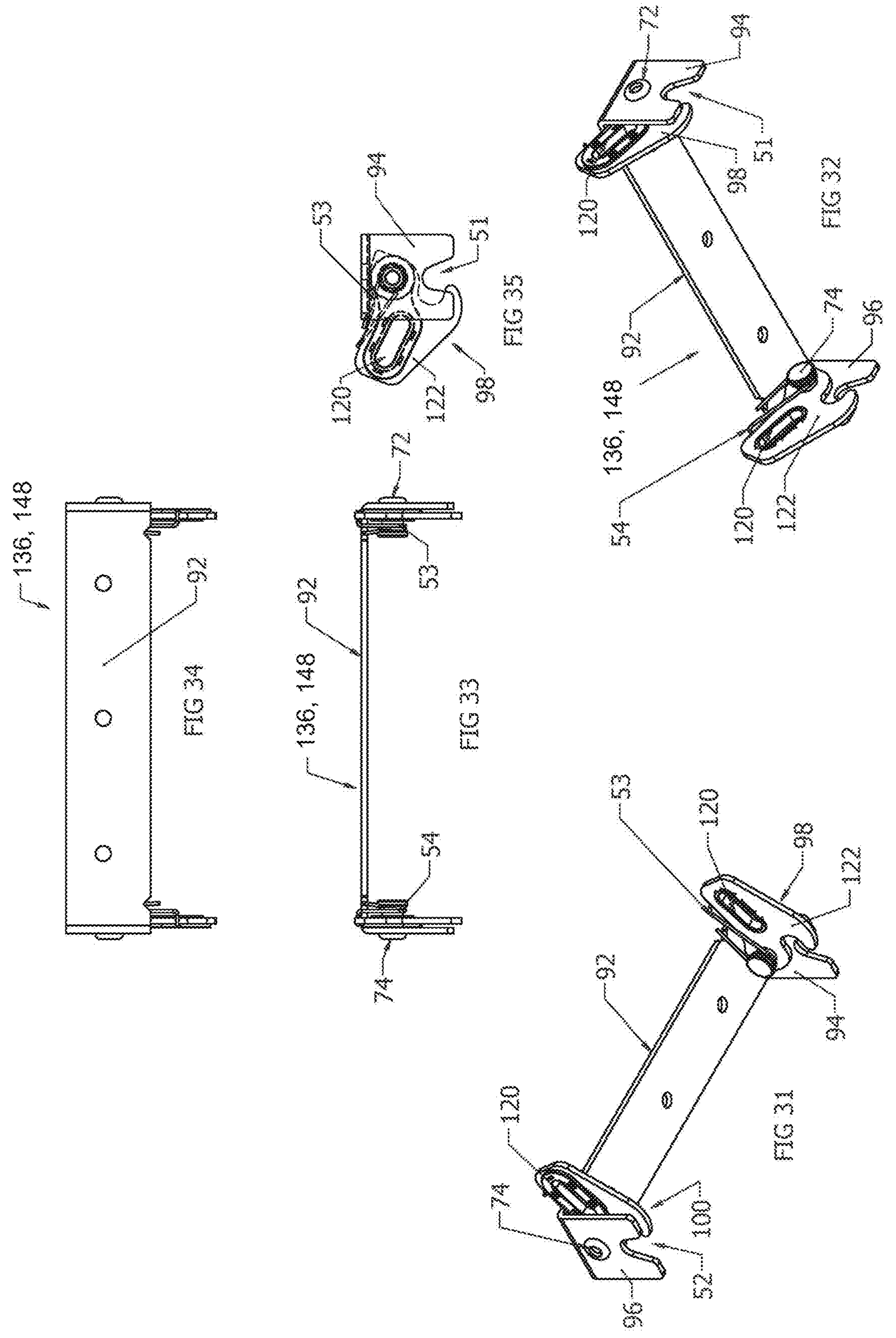
FIG. 31 is a bottom perspective view of a latch assembly.
FIG. 32 is a bottom rear perspective view of a latch assembly.
FIG. 33 is a front view of a latch assembly.
FIG. 34 is a top view of a latch assembly.
FIG. 35 is a side view of a latch assembly.
Figures 36, 37, 38, 39, 40:
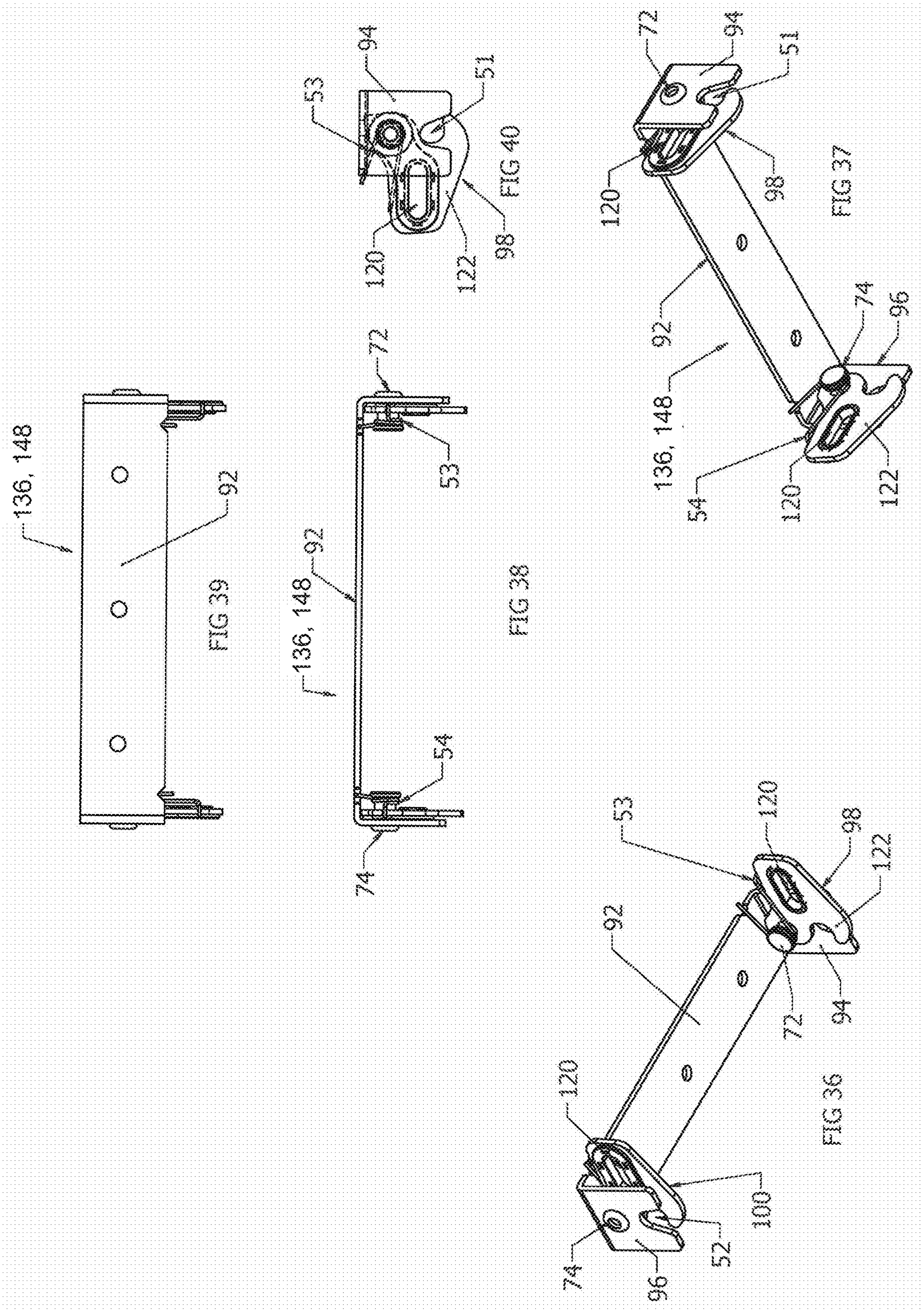
FIG. 36 is a bottom perspective view of a latch assembly.
FIG. 37 is a bottom rear perspective view of a latch assembly.
FIG. 38 is a front view of a latch assembly.
FIG. 39 is a top view of a latch assembly.
FIG. 40 is a side view of a latch assembly.

The first scaffold 14 may have a first track 76, as shown in FIGS. 16 and 17, to which the first hook assembly 34 is engaged and slides between a deployed position, where the hook crossbar 50 extends beyond the first scaffold 14, and a stowed position, where the hook crossbar 50 is retracted under the first scaffold 14. The first scaffold 14 may have a second track 78 in parallel and spaced relation with the first track 76 to which the first hook assembly 34 is engaged and slides between the deployed position and the stowed position. The first and second tracks 76, 78 may be attached to the underside 80 of the first scaffold 14. The hook assembly may have a cross plate 82 attached adjacent to and extending between a rear end 84 of the first and second hooks 56, 58. There may be a first block 86 and a second block 88 attached to the cross plate 82 which engage with and slide in the first track 76 and second track 78, respectively. At both ends of the first and second tracks 76, 78 may be stops preventing the first and second blocks 86, 88 from sliding out of the first and second tracks 76, 78.

The second latch assembly 48 may have a backing plate 92 which is attached to an underside of the second scaffold 40. The second latch assembly 48 may have a first bracket 94 with a first recess 51 which extends perpendicularly downward from the backing plate 92, and a second bracket 96 with a second recess 52 which extends perpendicularly downward from the backing plate 92 and in parallel and spaced relation with the first bracket 94. The hook crossbar 50 disposed in the first and second recesses 51, 52 when the first work platform 12 is locked to the second work platform 38.

The second latch assembly 48 may include a first latch assembly hook 98 and a second latch assembly hook 100. The first latch assembly hook 98 is rotationally attached to the first bracket 94, and the second latch assembly hook 100 is rotationally attached to the second bracket 96 such that as the first and second latch assembly hooks 98, 100 move down against the hook crossbar 50, the hook crossbar 50 cams open the first and second latch assembly hooks 98, 100 and moves into the first and second recesses 51, 52. As the hook crossbar 50 moves past the first and second latch assembly hooks 98, 100 and into the first and second recesses 51, 52 of the second work platform 38, the first and second latch assembly hooks 98, 100 of the second work platform 38 move back into the closed position under the action of the first and second springs 53, 54 of the second work platform 38 biasing the first and second latch assembly hooks 98, 100, respectively, of the second work platform 38 into the closed position which locks the hook crossbar 50 of the first work platform 12 into place in the first and second recesses 51, 52 of the second work platform 38.

As shown in FIGS. 9 and 10, the second latch assembly 48 may include a latch crank rod 102 connected with the first and second latch assembly hooks 98, 100. The second latch assembly 48 may include a first latch lever 104 attached to the latch crank rod 102 and to the second scaffold 40 which causes the first and second latch assembly hooks 98, 100 to retract to the open position when the first latch lever 104 is moved, so the hook crossbar 50 of the first work platform 12 is released from the first and second recesses 51, 52 and the second work platform 38 can be separated from the first work platform 12. The first latch lever 104 may be disposed on the outside surface of a first side 106 of the second scaffold 40. There may be a second latch lever 108 disposed on the outside surface of a second side 110 of the second scaffold 40 opposing the first side 106. If desired, the leg assemblies may be extended in height, as described in U.S. patent application Ser. No. 11/049,453; and 63/305,210, incorporated by reference herein. The leg assemblies may be rotatably attached to the scaffold using pinch locks, as described in U.S. patent applications 63/305,210; and Ser. No. 17/362,901, incorporated by reference herein. The latch crank rod 102 is attached to and extends between the first and second latch levers 104 and 108, passing through the slot 120 in the body 122 of each latch assembly hook 98 and 100, as shown in FIGS. 31-40. The latch crank rod 102 has a first section which is directly connected to the first latch lever 104 and extends through the first side 106 of the second scaffold 40, a second section directly attached to and at an angle with the first section, the third section directly attached to and at an angle with the second section, a fourth section directly attached to and added an angle with the third section, and a fifth section directly attached to and at an angle with the fourth section. The fifth section is directly attached to the second latch lever 108 and extends through the second side 110 of the second scaffold 40. The third section extends directly through the slot 120 and the body 122 of each latch assembly hook 98 and 100, as shown in the alternative embodiment in FIGS. 31-40. The latch crank rod 102 is used with the alternative embodiment latch assembly 136 and 138 shown in FIGS. 31-40. The first and second work platforms each may support at least 250 lbs. of load and over 500 lbs. of load. The work platforms safely support a typical person standing on the work platform without buckling or failing in some way.

As explained above, the first work platform 12 comprises a first plank or scaffold 14 having a first end 16 and a second end 18 and a plane 20 upon which a user can stand. The first work platform 12 comprises a first leg assembly 22 rotatably attached with bolts 24 to the first end 16 of the first scaffold 14. The first work platform 12 comprises a first hook assembly 34 slidingly attached to the first scaffold 14 adjacent the first end 16 which slides between a use position where the first hook assembly 34 extends below and outward beyond the first scaffold 14 between the first rail 26 and the second rail 28 of the first leg assembly 22 and a stowed position where the first hook assembly 34 is retracted below the first scaffold 14. The first work platform 12 comprises a first latch assembly 36 attached to the first scaffold 14 adjacent the second end 18. The first hook assembly 34 having a hook crossbar 50. The first work platform 12 comprises a first latch assembly 36 having latch assembly recesses 51, 52 and latch assembly hooks 98, 100 positioned about the recesses attached to the first scaffold 14 adjacent the second end 18.

As explained above, the present invention pertains to a method for using a work platform system 10. The method comprises the steps of sliding a first hook assembly 34 attached adjacent to a first end 16 of a first scaffold 14 into a use position where the first hook assembly 34 extends below and outward beyond the first scaffold 14 between a first rail 26 and a second rail 28 of a first leg assembly 22 rotatably attached adjacent to the first end 16 of the first scaffold 14 from a stowed position where the first hook assembly 34 is retracted below the first scaffold 14. The method includes the step of placing a second latch assembly 48 attached to a second scaffold 40 adjacent a first end 16 of the second scaffold 40 on the first hook assembly 34 in the use position. The method includes the step of pushing down on the second scaffold 40 so the second latch assembly 48 engages with the first hook assembly 34 and locks the first work platform 12 to the second work platform 38 with the first scaffold 14 coplanar with the second scaffold 40 and forming a surface.

The present invention pertains to a method for producing a work platform. The method comprises the steps of attaching a track to an underside of a scaffold. The method includes the step of fitting a hook assembly to the track so the first hook assembly 34 so the hook assembly slides along the track from a stowed position into a deployed position, where the first hook assembly 34 extends below and outward beyond the first scaffold 14 between a first rail 26 and a second rail 28 of a first leg assembly 22 rotatably attached adjacent to the first end 16 of the first scaffold 14, and when the first hook assembly 34 is in a stowed position, the first hook assembly 34 is retracted below the first scaffold 14. The method includes the step of attaching a latch assembly to the bottom of the scaffold.

Additional work platforms may be added in series to the first and second work platforms 12, 38 in the same way as described above through each of their respective latch assemblies and hook assemblies.

Figure 8:
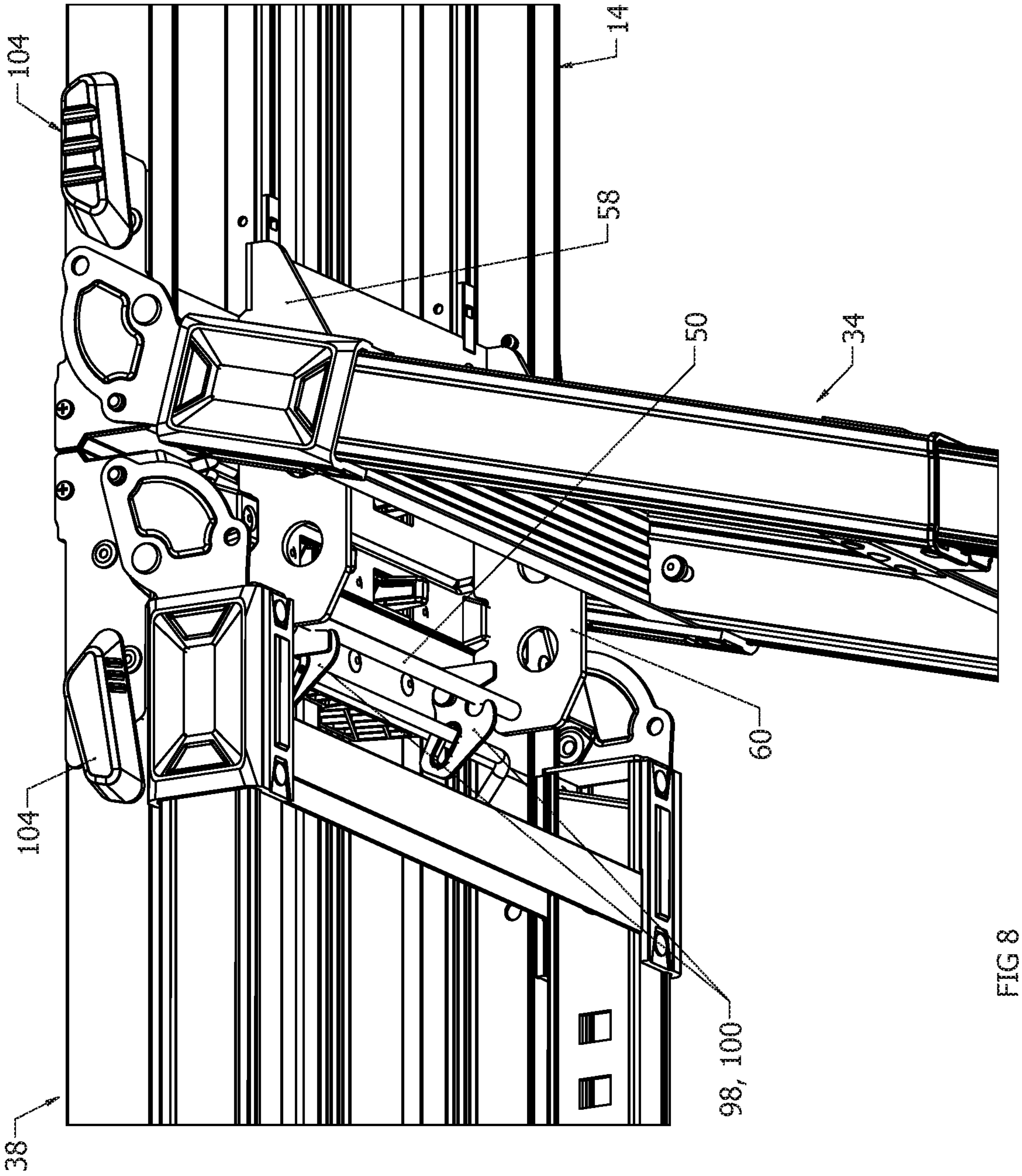
FIG. 8 is a bottom perspective view of a latch assembly and a hook assembly of a work platform system.

Referring to FIG. 8, once the hook assembly 34 is in the deployed position of the first work platform 12, the latch assembly hooks 98 and 100 of the latch assembly 48 of the second work platform 38 is positioned over the hook crossbar 50. The end of the second work platform 38 with the latch assembly is pressed down or dropped which causes the hook crossbar 50 to cam open the latch assembly hooks 98 and 100 and move into the recesses 51 and 52 of the latch brackets. As the hook crossbar 50 moves past the latch assembly hooks 98 and 100 and into the recesses 51 and 52 of the latch brackets 94 and 96, the latch assembly hooks 98 and 100 move back into the closed position under the action of springs biasing them into the closed position and locks the hook crossbar 50 into place in the latch assembly recesses 51 and 52. Additionally, the projections 68 and 70 of the second work platform 38 seat themselves in the hook assembly notches 64 and 66, to provide further stability and secure connection between the scaffolds of the first and second work platforms 12, 38.

To separate the second work platform 38 from the first work platform 12, one or both of the latch levers 104 and 108 are rotated downwards, causing the latch crank rod 102 attached to the latch lever 104 and 108 and connected with the latch assembly hooks 98 and 100 to retract the latch assembly hooks 98 and 100. With the latch assembly hooks 98 and 100 retracted, the second work platform 38 is free to be lifted off of the hook assembly 34 of the first work platform 12 and separated from the first work platform 12.

FIGS. 1A-1E show multiple views of a work platform for a work platform system 10. In these views the legs are seen in their folded and retracted positions. The hook assembly and the latch assembly are seen on the underside of the platform. The hook assembly is in its stowed position.

Figure 2C:
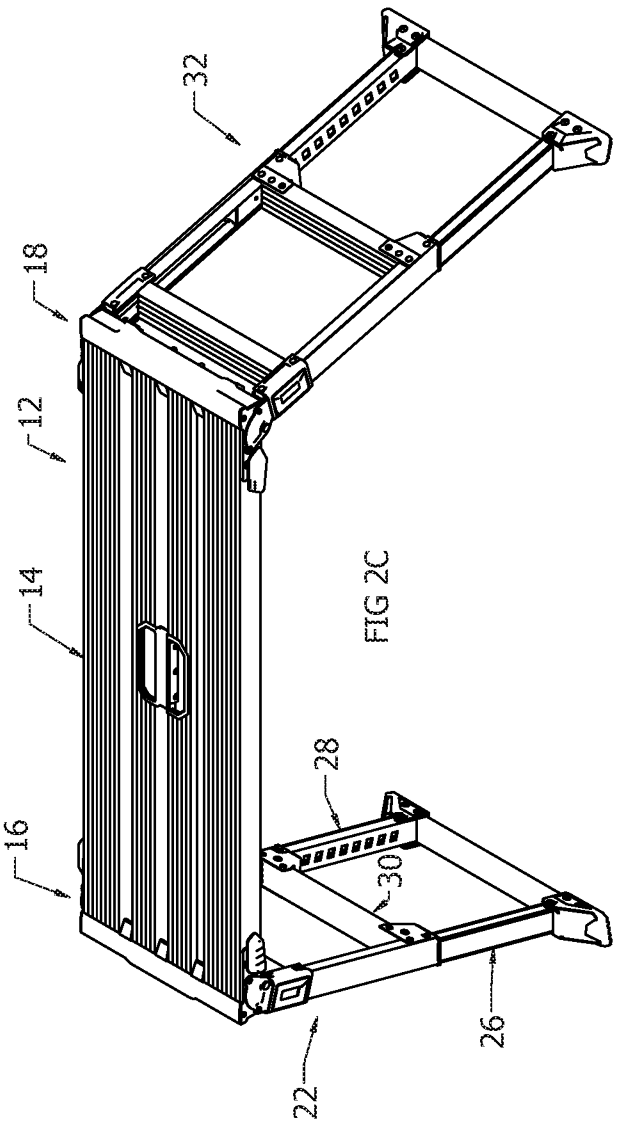
FIG. 2C is a perspective view of the work platform.
Figure 2B:
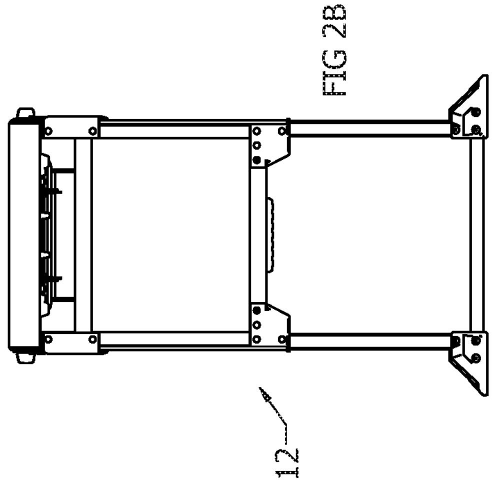
FIG. 2B is a front view of the work platform.
Figure 2A:
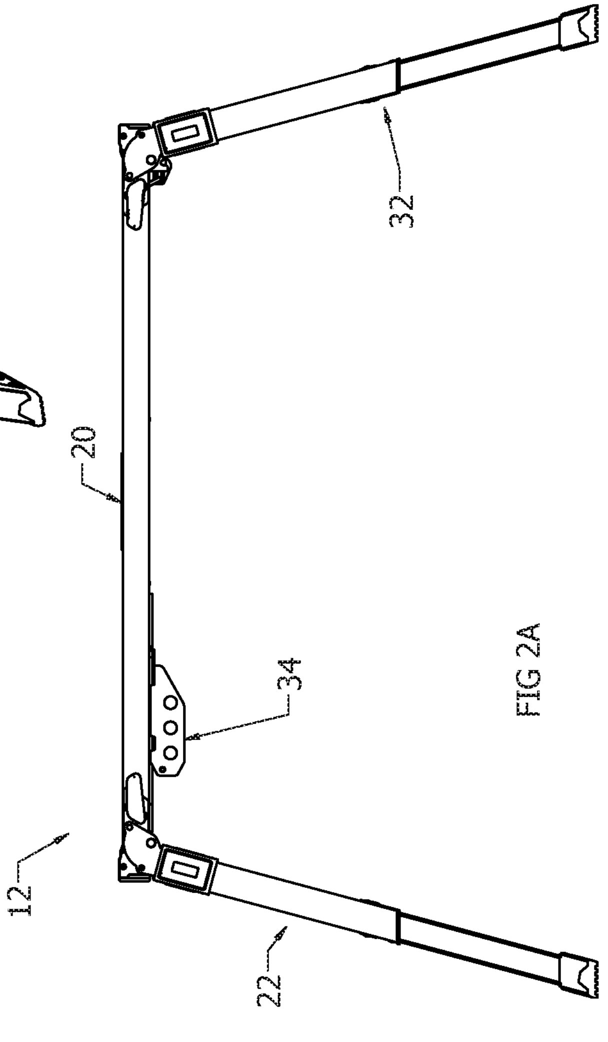
FIG. 2A is a side view of a work platform with leg assemblies in an extended position.

FIGS. 2A-2C show views of a work platform with the legs opened and fully extended. The legs can be extended in increments between fully retracted and fully extended. The hook assembly can be seen in the stowed position.

Figure 3:
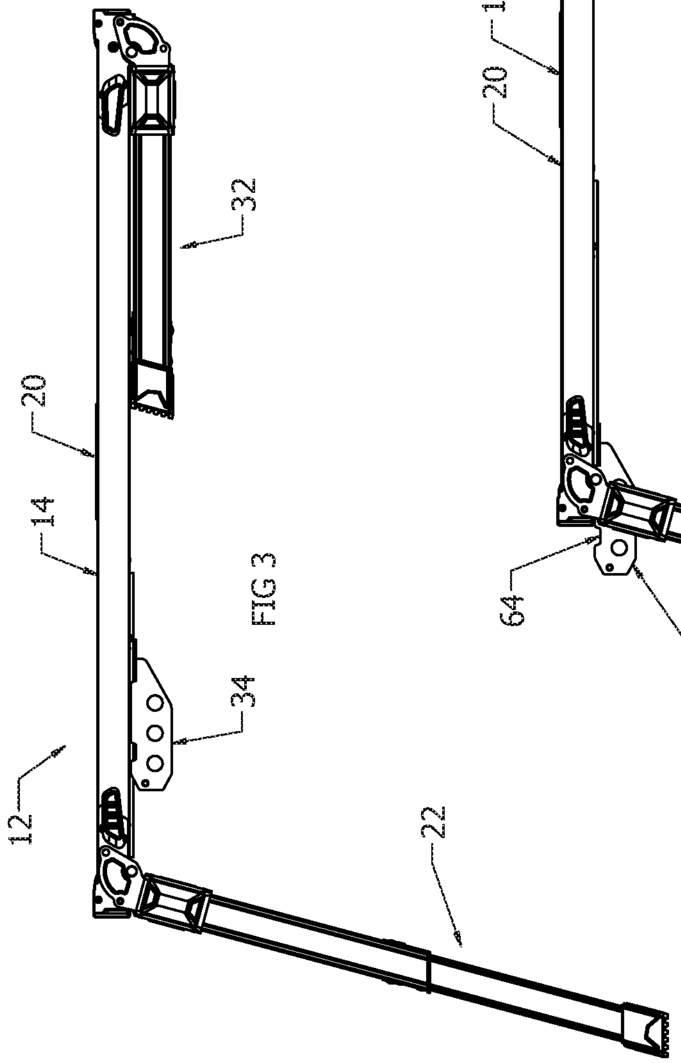
FIG. 3 is a side view of a work platform with one leg assembly in an extended position and one leg assembly retracted.

FIG. 3 shows a work platform with the leg at the hook assembly end opened and fully extended, and the leg at the latch assembly end closed and retracted. This configuration is called an extension work platform configuration.

Figure 4:
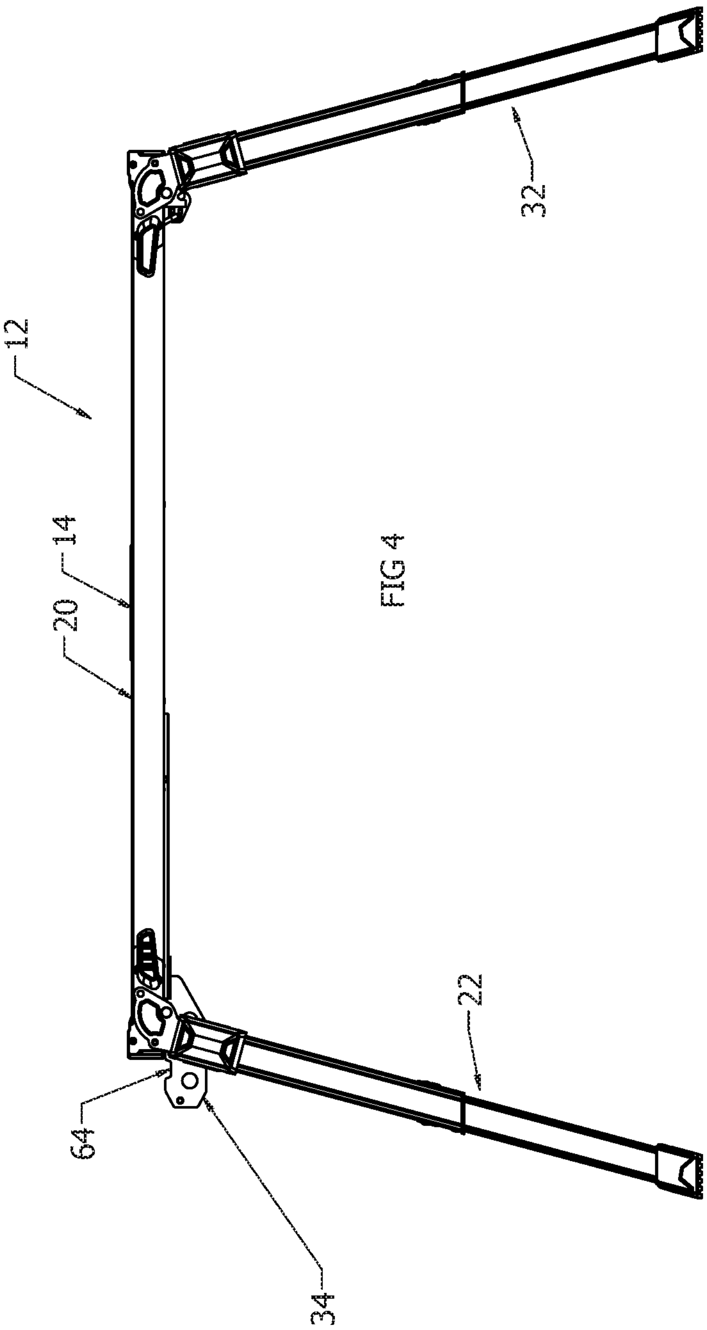
FIG. 4 is a side view of a work platform with leg assemblies in an extended position and a hook assembly in a deployed state.

FIG. 4 shows a work platform with both legs open and fully extended. Also, the hook assembly has been slid from its stowed position to its deployed position. This configuration is called a base work platform configuration. Notches in the hook assembly can be seen, also in FIG. 11.

Figure 5:
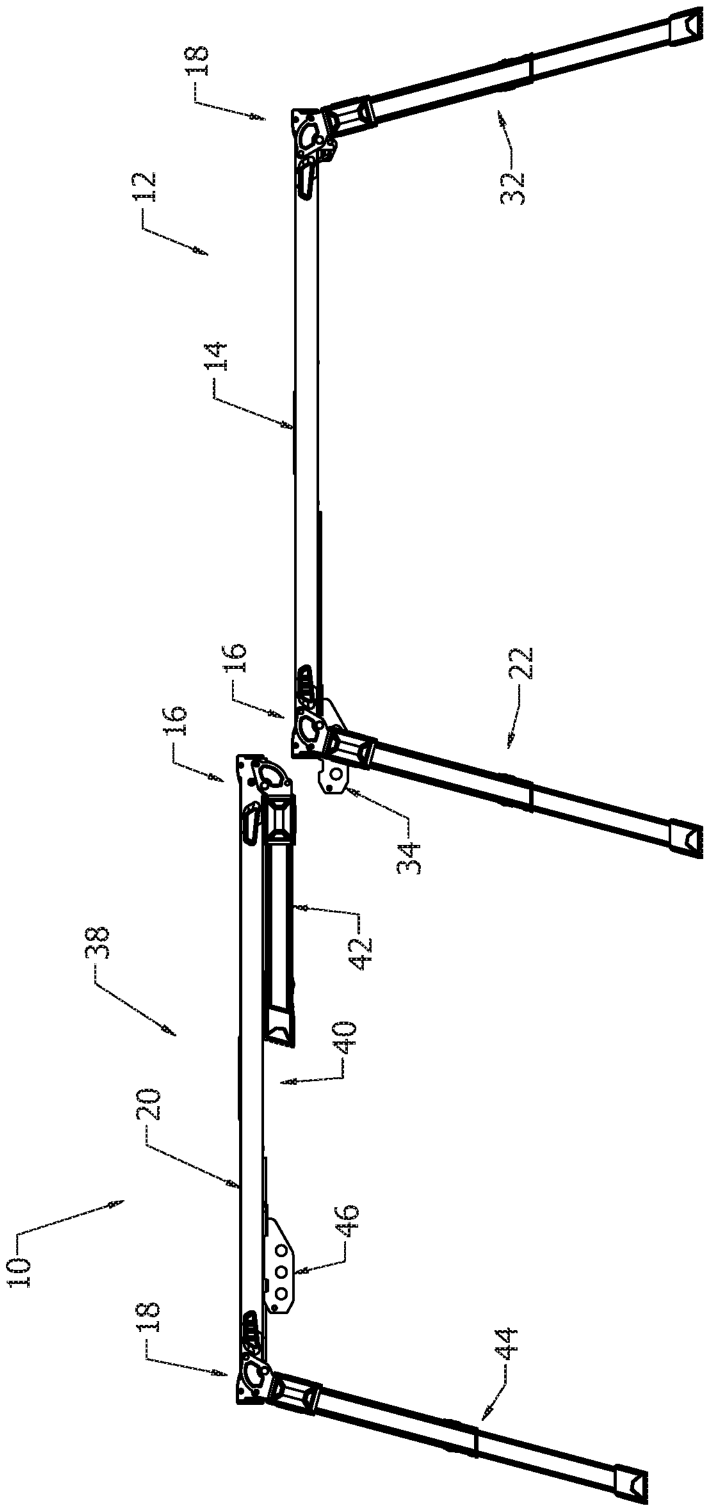
FIG. 5 is a side view of a work platform system including a first work platform and a second work platform adjacent one another.

FIG. 5 shows an extension work platform about to be joined to a base work platform to form an extended work platform. The extension work platform is lowered vertically to engage the base work platform.

Figure 6:
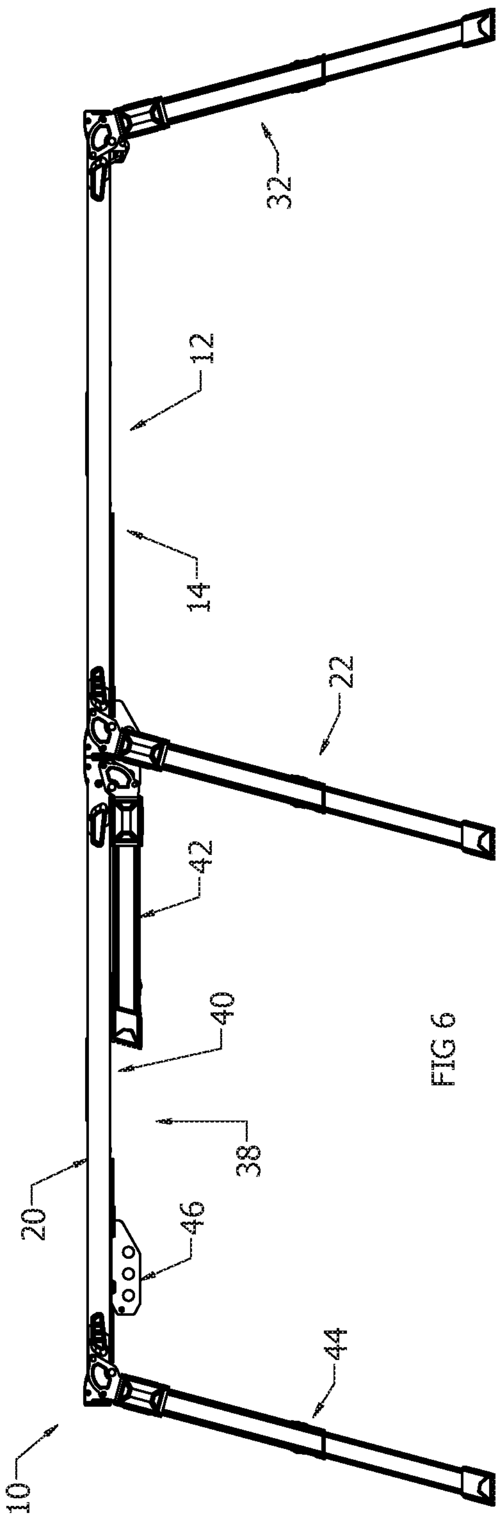
FIG. 6 is a side view of a work platform system including a first work platform and a second work platform joined together.

FIG. 6 shows the extension work platform joined to the base work platform. The latch assembly of the extension work platform automatically engages the hook assembly of the base work platform when the first and second work platforms 12, 38 are put into position.

Figure 7B:
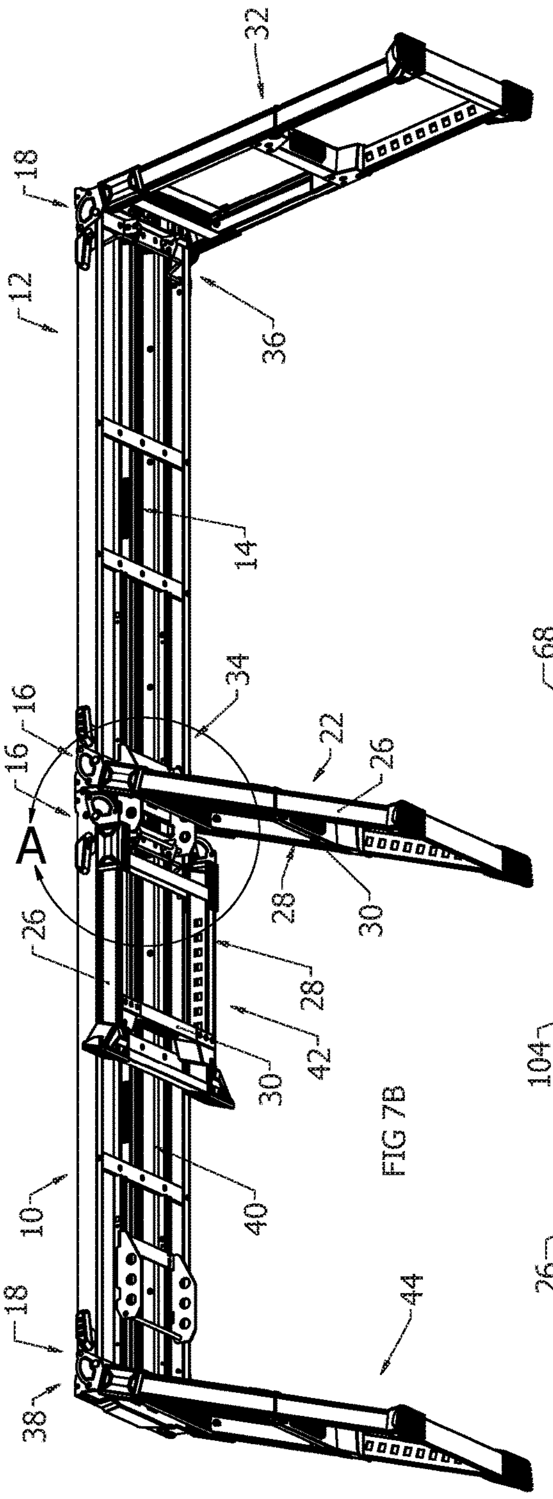
FIG. 7B is a bottom perspective view of a portion of the work platform system of FIG. 7A.
Figure 7A:
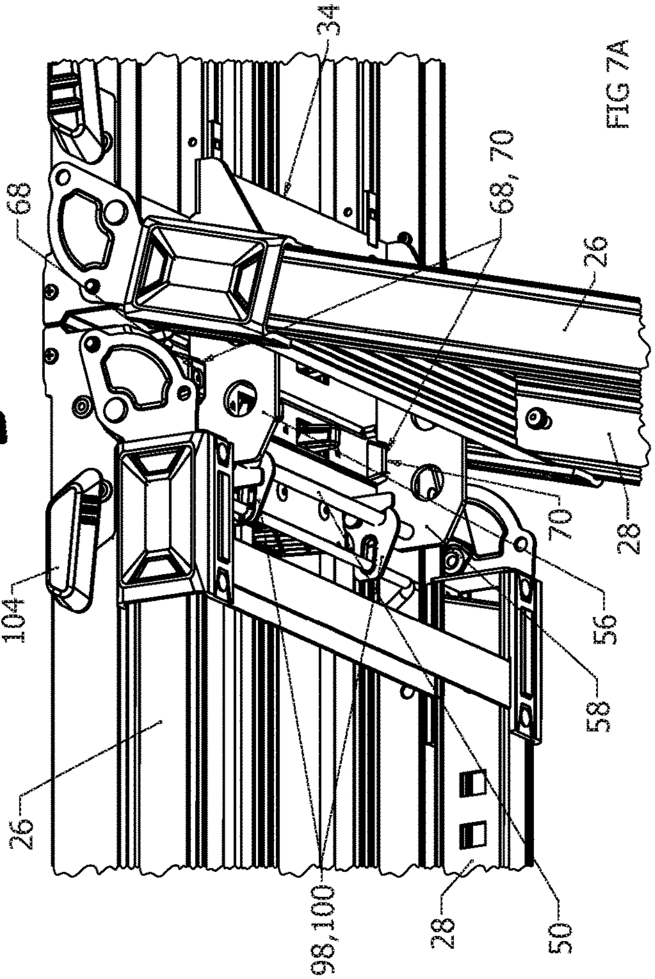
FIG. 7A is a bottom perspective view of a work platform system including a first work platform and a second work platform adjacent one another.

FIGS. 7A and 7B show how the latch assembly of the extension work platform engages the hook assembly of the base work platform to retain the crossbar of the base work platform hook assembly. Notice that projections on the extension work platform fit into notches in the hook assembly of the base work platform. These projections are shown in FIGS. 9 and 10. The notches are seen in FIG. 11.

In FIG. 8, the latch assembly has been unlatched so the extension work platform can be separated from the base work platform. This unlatching is accomplished by the user pressing down on a latch lever on the side of the platform. As seen in FIG. 10, there is a latch lever on both sides of the platform.

FIGS. 9 and 10 show the extension work platform with the legs not shown for clarity. It can be seen that pressing down on either latch lever causes the latch crank rod 102 to rotate, which in turn rotates the latch assembly hooks to their open position.

Figure 11:
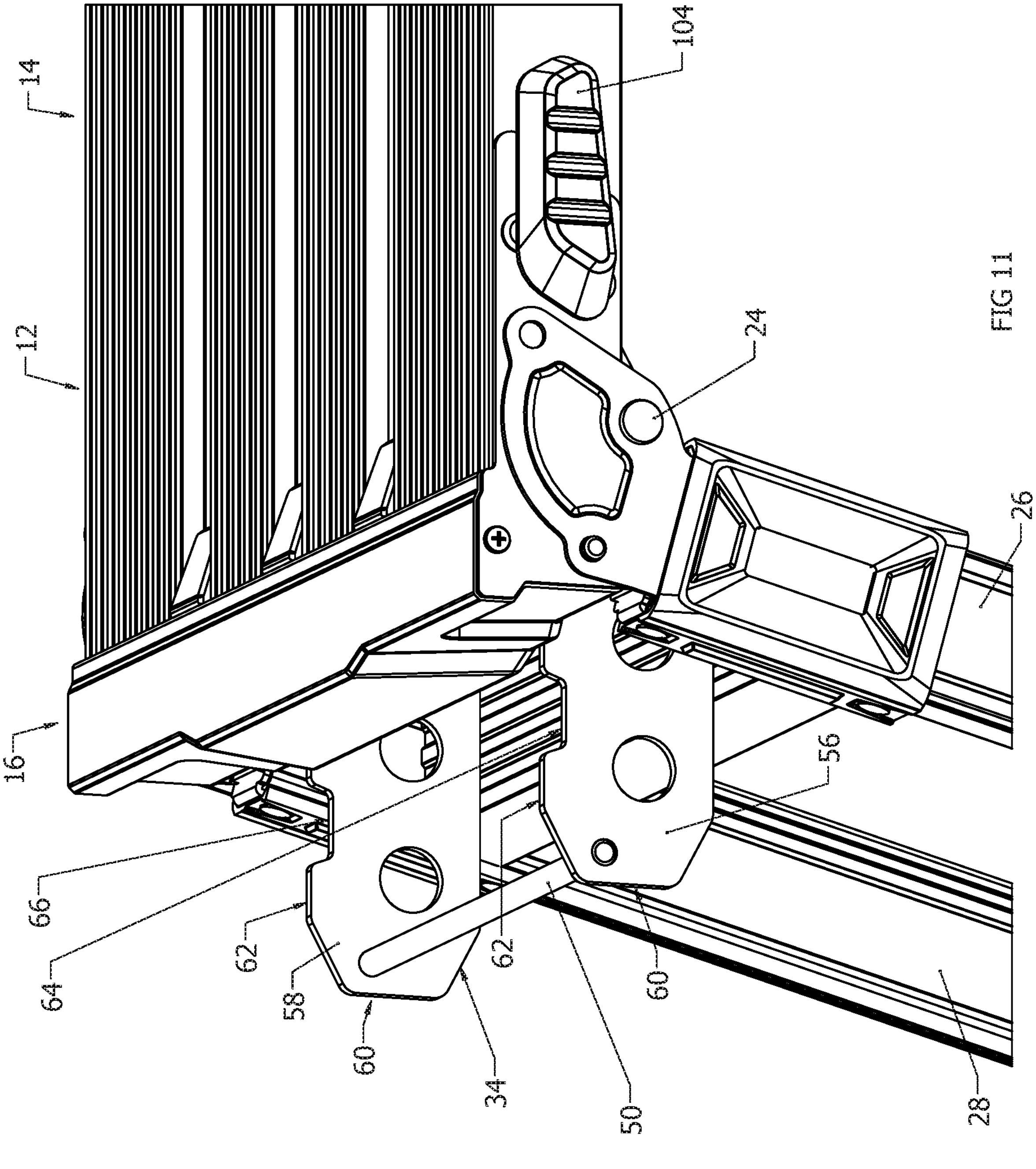
FIG. 11 is a perspective view of a portion of a hook assembly in a deployed position.
Figure 14:
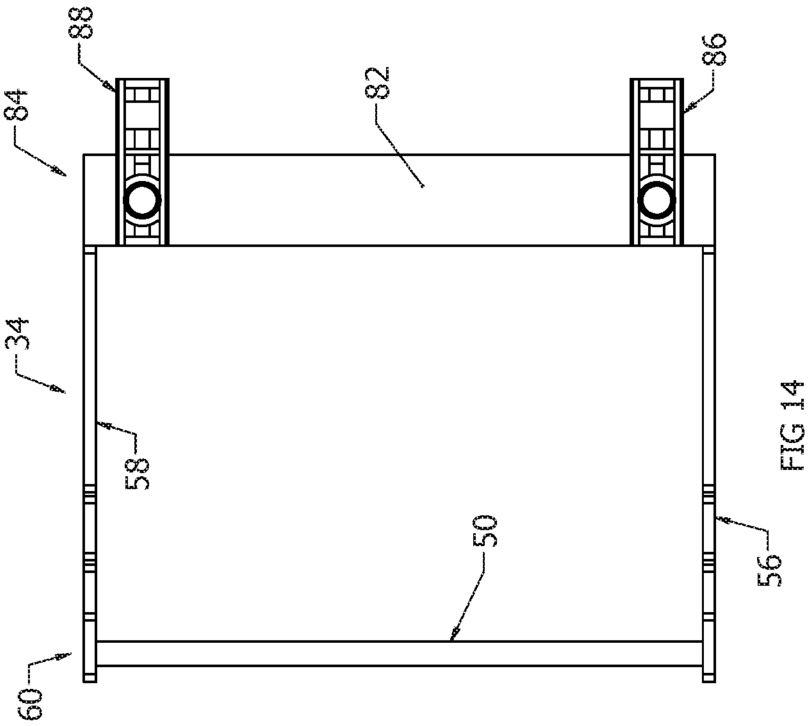
FIG. 14 is a top view of a portion of a hook assembly.
Figure 15:
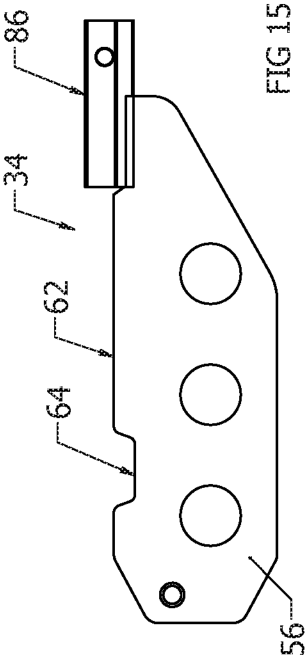
FIG. 15 is a side view of a portion of a hook assembly.
Figure 12:
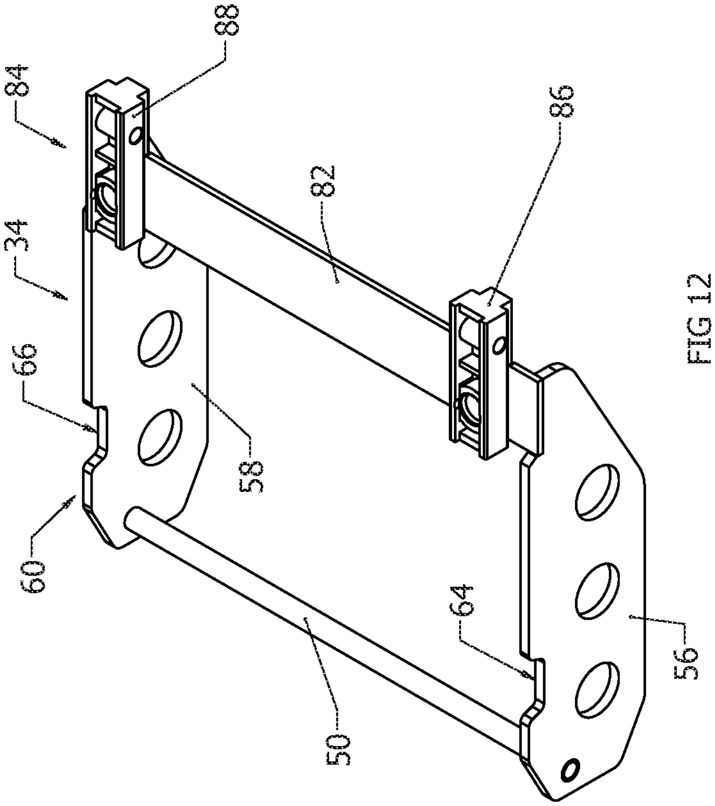
FIG. 12 is a rear perspective view of a portion of a hook assembly.
Figure 13:
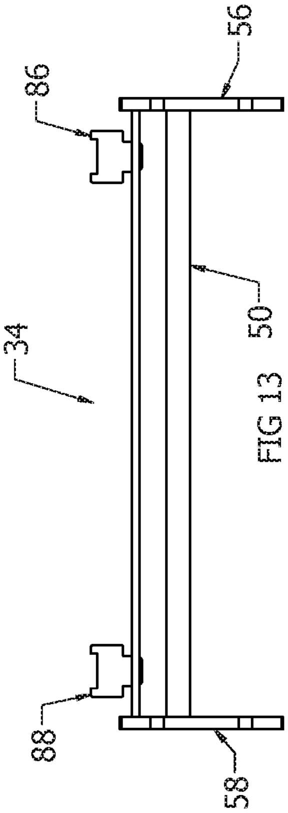
FIG. 13 is a rear view of a portion of a hook assembly.

The projections seen in FIGS. 9 and 10 and the notches seen in FIG. 11 interact to provide a visual guarantee that the extension work platform is securely engaged with the base work platform: the projections must fit into the hook assembly notches in order for the latch assembly to engage the hook assembly. If the extension work platform and the base work platform are not properly aligned and the projections are not able to seat into the notches, then the deck of the extension work platform will stick up above the deck of the base work platform. This provides a visual cue that the extension work platform is not properly latched to the hook assembly of the base work platform.

FIGS. 12-18 show components of the hook assembly and the hook assembly itself in a deployed position and a stowed position.

FIGS. 19-30 show the latch assembly in the unlatched position and the latched position.

FIGS. 31-40 show an alternative embodiment of the latch assembly in the unlatched position and the latched position.

FIGS. 41-44 show another alternative embodiment of the latch assembly in the unlatched position and the latched position.

Figure 41:
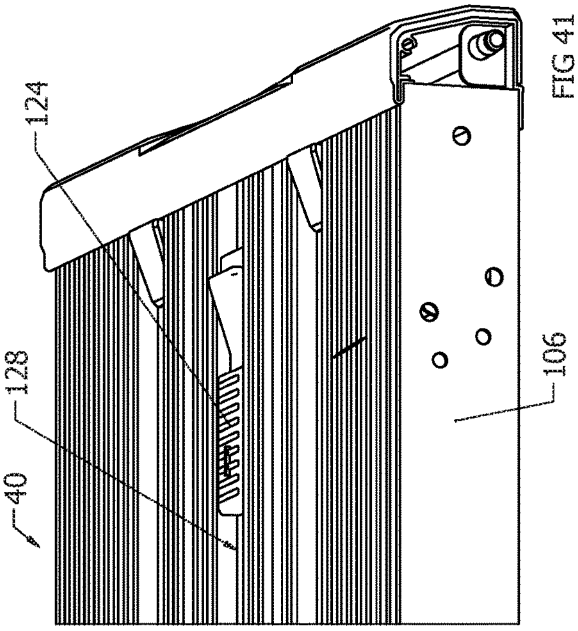
FIG. 41 is a perspective view of a portion of a latch assembly.
Figure 42:
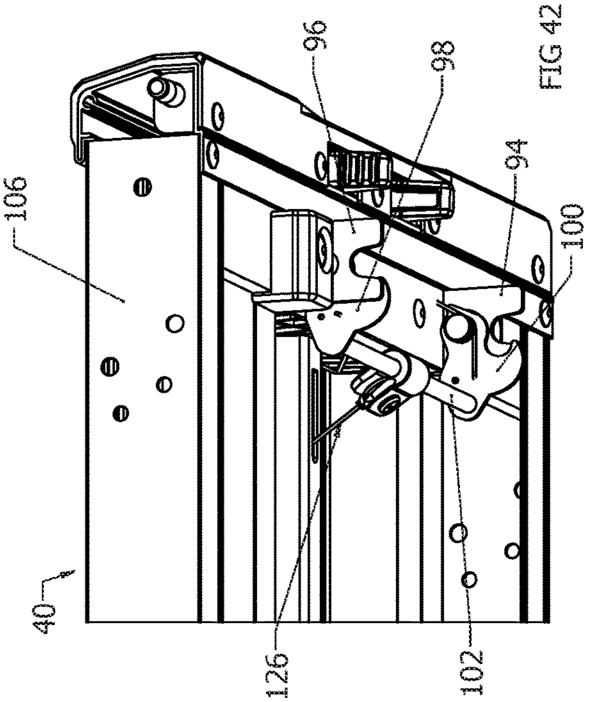
FIG. 42 is a bottom perspective view of a portion of a latch assembly.

In an alternative embodiment of the work platform, FIGS. 41 and 42 show an alternative latch actuation embodiment. The legs are not shown for clarity. A sliding latch button 124 on top of the second scaffold is connected by a cable 126 to the second latch assembly on the underside of the second scaffold. FIGS. 41 and 42 show the latch assembly in the latched position. The latch assembly embodiment shown in FIGS. 19-30 is used with the sliding latch button and cable.

Figure 43:
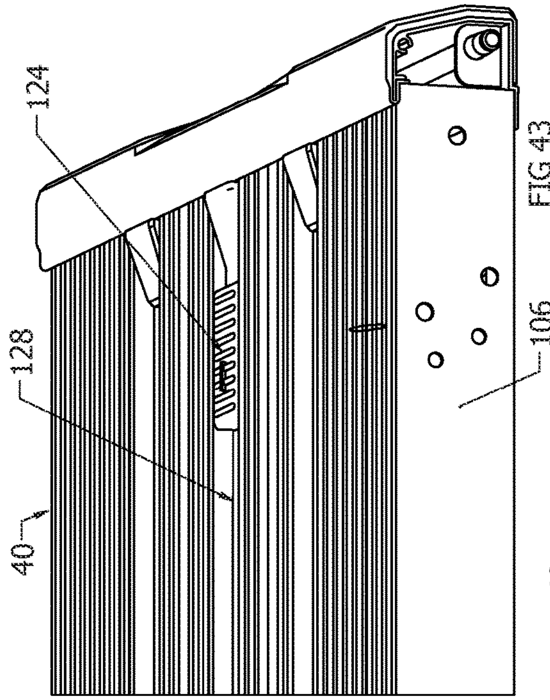
FIG. 43 is a perspective view of a portion of a latch assembly in an open position.
Figure 44:
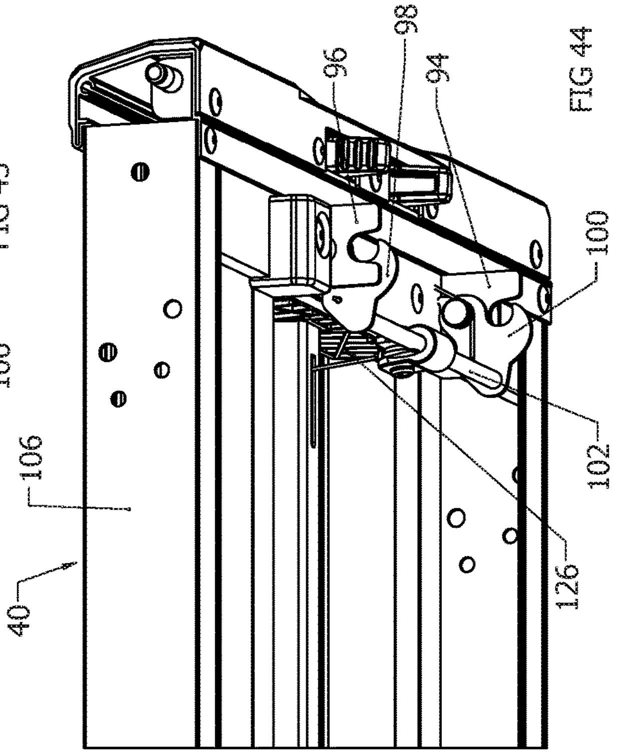
FIG. 44 is a bottom perspective view of a portion of a latch assembly in a closed position.

In FIGS. 43 and 44, the latch button 124 has been slid to the unlatched position. The cable 126 has pulled up on the second latch assembly causing the latch assembly hooks to move to the unlatched or open position. Other than the latch actuation details described here, this work platform embodiment operates in the same manner as the work platform embodiment described above. The cable 126 extends from the latch button 124, where it is attached, to the latch crank rod 102. The movement of the latch button 124 acts similar to the latch levers 104 and 108, causing the latch crank rod 102 to move and thus to move the first and second latch hooks into the open position. The latch springs operate in the same way, as described above, biasing the first and second latch hooks into the closed position and the latch button 124 back into the latched position. In this embodiment, the latch crank rod 102 is simply a single section beginning and ending at and between the first and second latch brackets, essentially corresponding to the third section of the latch crank rod 102 in the other embodiment. The sliding latch button 124 fits into a groove 128 in the second scaffold had about a center between the first and second sides of the second scaffold 40 so it does not protrude above the plane 20.

When connecting the first work platform 12 and the second work platform 38, with the first hook assembly 34 in the deployed position, a user aligns the second latch assembly 48 of the second work platform 38 with the hook crossbar 50 of the first hook assembly 34 of the first work platform 12 and presses downward. The second latch assembly 48 on the second work platform 38 automatically engages the hook crossbar 50 of the first hook assembly 34 of the first work platform 12. This is a very easy procedure. An additional feature of the work platform of the system 10 is a visual cue to let the user know that the two work platforms are properly aligned and connected via the projections 68, 70 of one platform being seated in the notches 64, 66 of another. The user may rotate the latch lever 104 which retracts the second latch assembly 48 to release the hook crossbar 50 of the first work platform 12 allowing for the two work platforms to be separated from one another.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A work platform comprising:

a plank extending longitudinally and having a first end and a second end;

a first leg assembly rotatably attached to the first end of the plank, the first leg assembly having a first rail and a second rail and a first rung attached to the first rail and the second rail, wherein the first leg assembly is rotatable about a first hinge;

a second leg assembly rotatably attached to the second end of the plank, the second leg assembly having a third rail and a fourth rail and a second rung attached to the third rail and the fourth rail, wherein the second leg assembly is rotatable about a second hinge; and a hook assembly and a latch assembly, wherein the hook assembly includes a hook crossbar slidably coupled to the plank adjacent the first end, the hook assembly slides between a use position where the hook crossbar extends beyond a perimeter of the plank between the first rail and the second rail of the first leg assembly and a stowed position where the hook crossbar is retracted below and within the perimeter of the plank, and wherein the latch assembly includes latch hooks coupled to the plank adjacent the second end.

2. The work platform of claim 1 wherein the hook assembly further comprises a first hook and a second hook that are attached to the hook crossbar, which extends between the first hook and the second hook.

3. The work platform of claim 2 wherein the hook assembly further comprises a first track and a second track attached to an underside of the work platform.

4. The work platform of claim 3 wherein the hook assembly further comprises a cross plate attached adjacent to and extending between a rear end of the first hook and the second hook.

5. The work platform of claim 4 wherein the hook assembly further comprises a first block and a second block attached to the cross plate, the first block and the second block slidably coupled to the first track and the second track, respectively.

6. The work platform of claim 1 wherein the work platform is configured to lock onto a second work platform via the hook assembly and a second latch assembly of the second work platform.

7. The work platform of claim 6 wherein the hook crossbar is configured to couple the second latch assembly of the second work platform via second latch assembly hooks.

8. The work platform of claim 1 wherein the hook assembly includes a first notch and a second notch.

9. The work platform of claim 1 wherein the work platform includes a first track and a second track, in parallel with the first track, to which the hook assembly is slidably coupled such that the hook assembly is slidable between the use position, where the hook crossbar extends beyond the work platform, and the stowed position, where the hook crossbar is retracted under the work platform.

10. The work platform of claim 1 wherein the first leg assembly and the second leg assembly are independently rotatable between an open position and a folded position.

11. The work platform of claim 10 wherein the first leg assembly and the second leg assembly are disposed substantially parallel to a top surface of the work platform when the first leg assembly and the second leg assembly are disposed in the folded position.

12. The work platform of claim 1 wherein the first leg assembly and the second leg assembly are extendable between an extended state and a retracted state, wherein a length of the first rail and the second rail is greater in the extended state than in the retracted state and a length of the third rail and the fourth rail is greater in the extended state than the retracted state.

13. The work platform of claim 12 wherein the first leg assembly and the second leg assembly are extendable at different lengths and rotatable at different angles.

14. The work platform of claim 1 wherein the work platform is configured to lock onto a second work platform via the latch assembly and a second hook assembly of the second work platform.

15. A work platform comprising:
- a plank extending longitudinally and having a first end and a second end;
- a first leg assembly rotatably attached to the first end of the plank, the first leg assembly having a first rail, a second rail, and a first rung therebetween, wherein the first leg assembly is rotatable about a first hinge;
- a second leg assembly rotatably attached to the second end of the plank, the second leg assembly having a third rail, a fourth rail, and a second rung therebetween, wherein the second leg assembly is rotatable about a second hinge; and
- a hook assembly disposed adjacent the first end of the plank and a latch assembly disposed adjacent the second end of the plank,
- wherein the hook assembly includes a cross plate, a hook crossbar, and a first hook and a second hook extending between the cross plate and the hook crossbar, wherein the hook assembly is slidably coupled to the plank between a use position where the hook crossbar extends beyond a perimeter of the plank between the first rail and the second rail of the first leg assembly and a stowed position where the hook crossbar is retracted below and within the perimeter of the plank.

16. The work platform of claim 15 wherein the latch assembly includes latch hooks coupled to the plank adjacent the second end, and
- wherein the hook assembly includes a first notch in the first hook and a second notch in the second hook, the first notch and the second notch being configured to engage with a portion of a second latch assembly of a second work platform.

17. The work platform of claim 16 wherein the work platform includes a first track and a second track on an underside of the plank, wherein the hook assembly has a first block and a second block that are slidably coupled with the first track and the second track, respectively.

18. A work platform comprising:
- a plank extending longitudinally and having a first end and a second end;
- a first leg assembly rotatably attached to the first end of the plank about a first hinge, the first leg assembly having a first rail, a second rail, and a first rung therebetween;
- a second leg assembly rotatably attached to the second end of the plank about a second hinge, the second leg assembly having a third rail, a fourth rail, and a second rung therebetween; and
- a hook assembly disposed adjacent the first end of the plank and a latch assembly disposed adjacent the second end of the plank,
- wherein the hook assembly includes a cross plate, a hook crossbar, a first hook and a second hook extending between the cross plate and the hook crossbar, and a first block and a second block extending from the cross plate, wherein the hook assembly is slidably coupled to the plank, and
- wherein the work platform includes a first track and a second track in parallel and spaced relation with the first track and the first block of the hook assembly is slidably coupled with the first track and the second block of the hook assembly is slidably coupled with the second track such that the hook assembly is slidably coupled with the first track and the second track between a use position, where the hook crossbar extends beyond the work platform, and a stowed position, where the hook crossbar is retracted under the work platform.

19. The work platform of claim 18 wherein the first hook includes a first notch and the second hook includes a second notch.

20. The work platform of claim 19 wherein the first notch and the second notch are configured to engage with a portion of a second latch assembly of a second work platform,
- wherein the first leg assembly and the second leg assembly are extendable between an extended state and a retracted state, and wherein the first leg assembly and the second leg assembly are extendable at different lengths and rotatable at different angles relative to the plank.

* * * * *